(12) United States Patent
Stern

(10) Patent No.: US 9,113,663 B2
(45) Date of Patent: Aug. 25, 2015

(54) MOBILE FIBERS AND ELONGATED STRUCTURES AND UNITS THEREOF

(71) Applicant: Thomas Stern, Lexington, KY (US)

(72) Inventor: Thomas Stern, Lexington, KY (US)

(*) Notice: Subject to any disclaimer, the term of this patent is extended or adjusted under 35 U.S.C. 154(b) by 222 days.

(21) Appl. No.: 14/039,314

(22) Filed: Sep. 27, 2013

(65) Prior Publication Data

US 2015/0093917 A1    Apr. 2, 2015

(51) Int. Cl.

| H01R 35/00 | (2006.01) |
|---|---|
| A41D 1/00 | (2006.01) |
| B25J 9/06 | (2006.01) |
| B25J 18/06 | (2006.01) |
| D03D 15/00 | (2006.01) |
| H01R 35/04 | (2006.01) |
| D03D 1/00 | (2006.01) |
| H01R 13/24 | (2006.01) |

(52) U.S. Cl.
CPC . *A41D 1/00* (2013.01); *B25J 9/065* (2013.01); *B25J 18/06* (2013.01); *D03D 1/0088* (2013.01); *D03D 15/00* (2013.01); *H01R 35/04* (2013.01); *H01R 13/2478* (2013.01)

(58) Field of Classification Search
CPC ........................................................ H01R 35/04
USPC ............................................................ 439/8
See application file for complete search history.

(56) References Cited

U.S. PATENT DOCUMENTS

| 3,284,964 A | 11/1966 | Saito |
|---|---|---|
| 4,393,728 A | 7/1983 | Larson |
| 4,751,821 A | 6/1988 | Birchard |
| 4,848,179 A | 7/1989 | Ubhayakar |
| 4,986,689 A | 1/1991 | Drutchas |
| 5,018,980 A * | 5/1991 | Robb ................................ 439/8 |
| 5,386,741 A | 2/1995 | Rennex |
| 5,523,730 A | 6/1996 | Van Zeeland |
| 6,102,582 A | 8/2000 | Espindola |
| 6,689,119 B1 | 2/2004 | DiCaprio |
| 6,764,214 B2 | 7/2004 | Shukla |
| 7,441,507 B2 | 10/2008 | Teraura |
| 8,414,246 B2 | 4/2013 | Tobey |
| 8,517,743 B2 * | 8/2013 | Robb ................................ 439/8 |
| 2002/0135448 A1 | 9/2002 | Van Zeeland |
| 2007/0282311 A1 | 12/2007 | Scott |
| 2008/0184737 A1 | 8/2008 | Wiseman |

* cited by examiner

*Primary Examiner* — Tho D Ta
(74) *Attorney, Agent, or Firm* — Stockwell & Smedley, PSC

(57) ABSTRACT

The present invention provides a unit or segment having a ball, a socket and a connector with the connector physically linking the ball and socket together such that a main opening of the socket continuous with the socket cavity faces away from the connected ball. Alternatively, a unit/segment may instead include a ball and a socket coupled directly together. Elongated structures comprising a plurality of units joined together in series, such as through ball joints and other connections, are further provided that may vary greatly in length and size. The ball and socket may have corresponding electromagnets and magnetic materials, respectively, that may attract or repel each other to cause controlled rotational movement of the individual ball joint(s) by controlling the operation of the electromagnets. Higher order structures including one or more elongated structures are further provided. Methods for constructing and/or operating units and/or elongated structures are further provided.

42 Claims, 9 Drawing Sheets

MOBILE FIBERS AND ELONGATED STRUCTURES AND UNITS THEREOF

BACKGROUND

1. Field of the Invention

The present invention relates to elongated arms, threads, fibers or other like structures that are able to controllably bend and move variably with undulating or serpentine-like motions.

2. Related Art

Flexible or bendable arm-like structures have been described, such as for robotics, typically to position a distal functional end of the arm, such as a clamp or set of gripping fingers, etc., to carry out an operation in space, such as to hold an object. A number of mechanisms have been described to cause movement or bending of these arm-like structures. However, none of these prior systems are known to combine separate actuating mechanisms for (1) lengthwise elongation/contraction and (2) lateral bending movements in a manner that is simple enough to allow for its reasonable construction and operation on a smaller scale, such as part of a small thread, fiber, etc. Many prior arm-like devices have only one of these two types of actuating movements and/or require a complex construction. Many of these prior actuating mechanisms for elongated structures are also constricted in their range of motion and/or unable to be easily and reversibly constructed in a modular fashion to reach variable lengths.

Accordingly, there is a need in the art for mobile or motive arm-like structures, threads, fibers, etc., that combine separately controlled elongation/retraction and lateral bending actuating movements that is simple enough in design to reasonably allow for its miniaturization (i.e., its construction and operation on a smaller scale). There is yet another need in the art for a mobile or motive arm-like structure, thread, fiber, etc., having a simple and modular construction that can be easily and reversibly constructed into threads, fibers, etc., of variable length.

SUMMARY

According to a first broad aspect of the present invention, a unit is provided comprising a ball, a socket and a connector with the ball and the socket physically connected, attached, linked, etc., together by the connector. Such a unit may comprise: a ball having a generally spherical outer shape and a first end and a second end, the first end and the second end being on opposite sides of the ball, the ball comprising: a central conducting channel; a lateral conducting channel; a plurality of spaced-apart electromagnets; and a controller, the controller being in electrical communication with one or more of the plurality of electromagnets; wherein the central conducting channel is configured to provide an electrical connection between a first outer position at or near the first end of the ball and a second outer position at or near the second end of the ball, and wherein the lateral conducting channel is configured to provide an electrical connection between the central conducting channel and at least one lateral outer position on a circumferential side of the ball.

According to this first broad aspect of the present invention, the unit may further comprise a connector and/or a socket. The connector may comprise a first end and a second end, the first end of the connector being fixedly attached to the second end of the ball. The socket may comprise a central portion and a circumferential side portion that surround a socket cavity, the central portion being located at or near a first end of the socket, and the circumferential side portion being located between the central portion and a second end of the socket, the socket cavity having a generally spherical inner shape, wherein the socket comprises: one or more pieces of magnetic material; a central conducting portion, the central conducting portion being located at or near a first end of the socket; and a lateral conducting portion, the lateral conducting portion being located at or near a second end of the socket, wherein the second end of the connector is fixedly attached to the first end of the socket, wherein the socket has a main opening, the perimeter of the main opening being bounded by the circumferential side portion at the second end of the socket, the main opening being continuous with the socket cavity, wherein the central conducting portion spans between and electrically connects a first inner surface and a first outer surface of the socket, wherein the lateral conducting portion spans between and electrically connects a second inner surface and a second outer surface of the socket, and wherein the second inner surface and the second outer surface are closer to the second end of the socket than the first inner surface and the first outer surface, respectively.

According to a second broad aspect of the present invention, a unit or segment is provided comprising a ball and a socket coupled together. Such a unit may comprise: a ball having a generally spherical outer shape and a first end and a second end, the first end and the second end being on opposite sides of the ball, the ball comprising: a central conducting channel, the central conducting channel being configured to provide an electrical connection between a first outer position at or near the first end of the ball and a second outer position at or near the second end of the ball; and a lateral conducting channel, the lateral conducting channel being configured to provide an electrical connection between the central conducting channel and at least one lateral outer position on a circumferential side of the ball; a plurality of spaced-apart electromagnets; and a controller, the controller being in electrical communication with one or more of the plurality of electromagnets; and a socket, the socket having a central portion and a circumferential side portion surrounding a socket cavity, the central portion being located at or near a first end of the socket, and the circumferential side portion being located between the central portion and a second end of the socket, the socket cavity having a generally spherical inner shape, wherein the socket comprises: one or more pieces of magnetic material; a central conducting portion, the central conducting portion being located at or near a first end of the socket and spanning between and electrically connecting a first inner surface and a first outer surface of the socket; and a lateral conducting portion, the lateral conducting portion being located at or near a second end of the socket and spanning between and electrically connecting a second inner surface and a second outer surface of the socket, wherein the second inner surface and the second outer surface of the socket are closer to the second end of the socket than the first inner surface and the first outer surface of the socket, respectively, wherein the socket has a main opening at the second end of the socket that is continuous with the socket cavity, and wherein the ball is positioned inside the socket to couple the ball and the socket together.

According to a third broad aspect of the present invention, an elongated structure is provided comprising a plurality of units that are joined together by coupling a ball of one unit to a socket of an adjacent unit. Such an elongated structure may comprise: a first unit comprising a first ball, a first socket and a first connector, the first ball and the first socket being physically linked together by the first connector; and a second unit comprising a second ball, a second socket and a second connector, the second ball and the second socket being physically linked together by the second connector, wherein the first ball and the second ball each have a generally spherical outer shape and a first end and a second end, the first ball and the second ball each comprising: a central conducting channel, the central conducting channel being configured to provide an electrical connection between a first outer position at or near the first end and a second outer position at or near the second end of the respective ball; and a lateral conducting channel, the lateral conducting channel being configured to provide an electrical connection between the central conducting channel and at least one lateral outer position on a circumferential side of the respective ball; a plurality of spaced-apart electromagnets; and a controller, the controller being in electrical communication with one or more of the plurality of electromagnets, and wherein the first socket and the second socket each have a first end and a second end, a socket cavity and a main opening, the socket cavity having a generally spherical inner shape, and the main opening being positioned at the second end of the socket and continuous with the socket cavity, the first socket and the second socket each comprising: one or more pieces of magnetic material; a central conducting portion, the central conducting portion being located at or near a first end of the respective socket and spanning between and electrically connecting a first inner surface and a first outer surface of the respective socket; and a lateral conducting portion, the lateral conducting portion being located at or near a second end of the respective socket and spanning between and electrically connecting a second inner surface and a second outer surface of the respective socket, wherein the second ball of the second unit is positioned inside the first socket of the first unit to couple the first unit and the second unit together.

According to a fourth broad aspect of the present invention, methods are provided for assembling, constructing, etc., a unit or segment and/or an elongated structure. The units and/or elongated structures of the present invention may be pre-constructed to include electrically conductive portion(s) to permit an electrical current to flow through them along various path(s). The unit or segment may generally be assembled, etc., by coupling a socket and a ball together or by physically attaching a ball and/or a socket to a connector. Such a method of constructing a unit may comprise: (a) attaching a second end of a ball to a first end of a connector; and (b) attaching a first end of a socket to a second end of the connector, wherein a central conducting channel is present between an inner surface of a socket cavity of the socket and an outer surface of the ball, and wherein the central conducting channel provides a continuous path for the flow of an electrical current. Alternatively, a method for constructing an elongated structure may comprise: coupling a first unit to a second unit; wherein the first unit comprises a first ball, a first socket and a first connector, the first ball and the first socket being physically linked together by the first connector, wherein the second unit comprises a second ball, a second socket and a second connector, the second ball and the second socket being physically linked together by the second connector, and wherein the coupling step is carried out by inserting or placing the second ball of the second unit inside a socket cavity of the first socket of the first unit. Methods of constructing or forming an elongated structure may further comprise covering the elongated structure with a sheath. These methods further provide combining a plurality of elongated structures to form higher order structures, perhaps in combination with one or more sheets or fabrics, such as motive fabrics/sheets, flippers, fans, turbines, limbs, etc.

According to a fifth broad aspect of the present invention, methods are provided for operating and/or causing movement of an elongated structure of the present invention comprising a plurality of units of segments coupled together in series. By creating and/or changing the magnetic force generated by one or more electromagnets of a ball of a ball joint (forming part of a unit or joining two adjacent units together), the ball joint may be caused to turn or rotate due to one or more pieces of magnetic material in the socket being attracted or repelled by the magnetic force generated by the electromagnet(s) to cause a bend or turn in an elongated structure at that position. Similarly, by creating and/or changing the magnetic force generated by an electromagnet in a first corresponding portion of a longitudinal actuator (the longitudinal actuator being also being a connector that physically links a ball and socket of a unit or adjacent units together), the longitudinal actuator may be caused to extend or contract due to one or more pieces of magnetic material present in a second corresponding portion of the longitudinal actuator being attracted or repelled by the magnetic force generated by the electromagnet(s) of the first corresponding portion. According to these methods, the strength and timing (and even the direction) of the magnetic field generated by each of the electromagnets may be controlled by a controller located in each unit, such as the ball of each unit, which may be in response to signals or instructions received from a central or base computer.

These and other aspects of the present invention will become apparent to those skilled in the art after reading the following description and claims with the accompanying drawings.

BRIEF DESCRIPTION OF THE DRAWINGS

The accompanying drawings, which are incorporated herein and constitute part of this specification, illustrate exemplary embodiments of the invention, and, together with the detailed description herein, serve to explain features of the present invention.

DETAILED DESCRIPTION

Figure 1A:
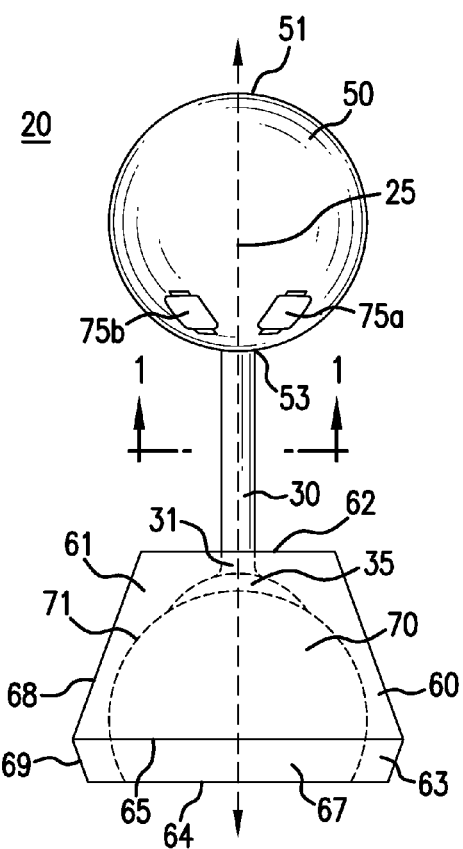
FIG. 1A is a side view of a unit or segment according to an embodiment of the present invention that may be used to form an elongated fiber.

Threads, fibers, strings, cords, ropes, wires, cables, etc., are all examples of elongated structures that may be used for a variety of purposes, such as tying things together, weaving into a fabric, etc. While these elongated structures are generally able to carry out these functions due to their tensile strength, they are inanimate structures until an external force is applied to them. In contrast, the present invention provides elongated structures, such as threads, fibers, strings, etc., and possibly larger arm-like or other elongated structures, comprising a plurality of units or segments that are able to be animated by their controlled, relative movement(s) in a variety of ways. These controllable movements generally include the ability of one or more of the units or segments of the elongated structure, or at least a portion of those units/segments and/or the attachment(s) between them, to (i) extend or contract/retract in length and/or (ii) laterally bend in various directions, such that the elongated structure of the present invention can take on, adopt, assume, etc., a desired three-dimensional shape and positioning of the units/segments in space along the length of the elongated structure. As will be explained further below, the nature of these movements may also be controlled in terms of their strength, speed and extent/distance of movement, such that the manner of transitioning to a new three-dimensional shape and positioning of the units/segments of an elongated structure may also be controlled.

According to embodiments of the present invention, an elongated structure generally comprises a plurality of individual units or segments (i.e., two or more) that are joined together to form the elongated structure. Such an elongated structure of the present invention, and the individual units or segments thereof, may have a variety of different constructions, sizes and/or shapes as described herein. The units or segments of an elongated structure may generally be repeating units, although an alternating pattern of different types, variations and/or sizes of units, as well as other repeating patterns of different types, variations and/or sizes of units, are also possible. In addition, it is conceivable that one or more specialized component(s), segment(s) or unit(s) may be inserted into a series or chain of units/segments of an elongated structure, such as to provide a particular or additional function(s).

Embodiments of the present invention further include the individual segment(s) or unit(s) themselves as described herein, which may be used as part of an elongated structure. According to many embodiments, a plurality of segments or units of the present invention may be easily and/or reversibly assembled or attached together in a linear series to form an elongated structure of the present invention of desired length. A tubular sheath may also surround the units/segments along the length of an elongated structure according to many embodiments.

Neighboring or adjacent units in the chain or series of units of an elongated structure may be connected, attached, assembled, etc., together by a ball-and-socket type of coupling or joint to allow for a range of articulating, bending, turning, and/or rotational movement or motion relatively between those adjacent units or segments of the elongated structure. A bending or articulating actuator may be incorporated into the coupling of such a ball joint between adjacent units/segments to control and/or cause articulation, angular bending, turning and/or rotational movement or motion relatively between those adjacent segment(s)/unit(s) of the elongated structure to affect the angular bending of the elongated structure between those units/segment(s), which may also affect the overall shape of the elongated structure as a whole. Such angular bending, turning and/or rotational movement may generally be at a lateral angle relative to the longitudinal axis of the elongated structure comprising those adjacent units/segments. Such angular bending movement may be controllably caused to occur in any direction relative to the longitudinal or central axis of a unit/segment and/or the elongated structure as a whole (e.g., in any direction 360° around such a longitudinal or central axis). In any of those directions, the amount of lateral bending, turning, etc., may also occur to varying extents such that a range of lateral bending angles may be controllably formed in that direction. The central (or symmetrical) axis of a component is defined below.

A purely "lateral rotation" of a ball joint may refer to the ball rotating relative to the socket (coupled to the ball) in a lateral direction to cause a bend, turn, etc., in the ball joint and/or elongated structure, such that the angle between the central axes of the ball and socket is changed. On the other hand, a purely "circumferential rotation" of a ball joint may refer to the ball rotating relative to the socket in a circumferential direction to cause the ball and socket to spin relative to each other, such that the angle between the central axes of the ball and socket does not change. Such lateral rotation may generally result in an inward angle (in the direction of bending) and an outward or outer angle (in the opposite direction) formed between the central axes of the ball and socket. However, a controlled rotational movement of a ball joint may also be described as a rotational vector that may include a combination of lateral and circumferential rotational movement(s).

An elongated structure as a whole may be described as having a single "longitudinal axis" that passes through it along its length when it is "fully extended" (i.e., with all of the central axes of the components and units/segments of the elongated structure (and/or the longitudinal axis of the units/segments) aligned and parallel with each other). Such a fully extended state of an elongated structure, or any portion thereof, would exist when all of the ball joints of the elongated structure do not have a different inner and outer angle formed at each of the ball joints thereof (i.e., with no bending, turning, etc.).

An axial or longitudinal actuator may also be incorporated into a unit or segment or possibly positioned between adjacent units or segments. This longitudinal actuator may cause extension and/or contraction (or retraction) movement within or between units/segment(s) of an elongated structure to affect the spacing or distance of the elongated structure within or between those units/segment(s), which may also affect the overall length of the elongated structure as a whole. Since a longitudinal actuator may generally operate in only one dimension or axis, each longitudinal movement caused by the longitudinal actuator may generally be described in terms of an amount of extension or contraction movement.

Thus, each of the units or segments of an elongated structure of the present invention may have (i) an associated articulating or bending actuator (for bending or turning movement) and/or (ii) an associated axial or longitudinal actuator (for lengthwise extension and contraction movement). Each of these actuators (corresponding to, and/or associated with, a unit(s) or segment(s) of an elongated structure) may be positioned either within a unit/segment or between adjacent units/segments, depending on how the units or segments are defined. If the actuator is positioned "between" adjacent units/segments, each of the adjacent units/segments may have corresponding portions that are coupled, mated, etc., together to form the actuator and/or hold those corresponding portions of the actuator together. Accordingly, the actuator may serve as an attachment, or be incorporated into an attachment, between two adjacent units/segments.

The net or cumulative effect caused by the individual movements, states or operations of these actuators will cause an elongated structure to take on, adopt, move to, assume, etc., a particular three-dimensional pose, shape, set of positions, etc. Each of the actuators may be individually and/or separately controlled to cause each of the units or segments of the elongated structure to become positioned at a particular location in space (for at least a moment or period of time), the net effect of which may be to cause the elongated structure as a whole to adopt, etc., a particular pose, shape, etc. (for at least that moment or period of time). The positions of each of the individual units or segments of an elongated structure in space may also be dynamically controlled to change their position(s) in space over time by controlling the various actuators of the elongated structure. Such dynamic control and coordinated movement of the units/segments of an elongated structure (by controlling the movements of the various actuators) may be used to cause a pattern or sequence of movement of the elongated structure over time.

According to embodiments of the present invention, a segment or unit 20 is shown in FIG. 1A comprising a ball 50, a connector 30 (e.g., a rod, post or pedestal), and a socket 60 for receiving a ball of another unit or segment. This unit or segment 20 may be used in making, assembling, constructing, etc., an elongated structure, such as a fiber, etc., of the present invention. The connector 30 may be positioned between the ball 50 and the socket 60 and link the ball 50 and socket 60 of the unit or segment together. The socket 60 will also generally have a main opening continuous with the socket cavity 70 at least for allowing the connector 30 attached to the ball 50 to move during rotational movement(s) of the ball joint. The perimeter of the main opening may be bounded by the second end 64 and/or a circumferential side portion (see below) of the socket 60.

According to embodiments of the present invention, the ball and the socket cavity may each be generally spherical in shape (at least along its outer or inner surface, respectively—i.e., having a generally spherical outer or inner shape). Although the ball and socket are preferably solid (generally) in their construction, they may conceivably be porous and/or contain hollow portion(s) and/or contain holes, indentations, etc., as long as their function as part of a ball joint of sufficient strength and freedom of rotational movement is maintained.

The construction of the ball joint must also minimally include the required electrically conductive portions as explained below. The ball may also have a non-spherical portion at or near its second end (i.e., at or near where the connector attaches to the ball) especially if this part of the ball does not enter or directly interact with the socket cavity. With any of the variations described herein, a ball or socket may be described as having a generally spherical outer or inner shape, respectively, in reference to the mated portions of the ball and socket regardless of any openings, minor non-spherical portions, etc., that may also be present. Thus, an elongated structure may be formed by assembling, joining, connecting, coupling, attaching, etc., two or more of these units together in series by placing, inserting, etc., the ball of one unit into the socket of another unit to form an elongated structure of the present invention.

Each of the individual units or segments may vary greatly in its size and length/width dimensions depending on the application. The "length" dimension of a component (e.g., a ball, socket, etc.) is along the central axis of the component, which may also be along the longitudinal axis of the unit/segment and/or elongated structure as a whole, whereas the "width" dimension of the component, unit/segment, and/or elongated structure is in a direction perpendicular thereto, which may also be in a lateral direction relative to the longitudinal axis of the unit/segment and/or elongated structure as a whole. To form a motive fiber or thread, the width of the elongated structure, unit/segment and/or socket may potentially vary between being microscopic (e.g., 100-500 microns or micrometers in width) to the size of a thread or string (e.g., a fraction of a millimeter to a few millimeters in width). To form a larger elongated structure similar in size to a cable, rope, or the like, the lateral width of the elongated structure, unit/segment and socket may potentially vary between a fraction of a centimeter (e.g., 10-100 mm) to several centimeters (e.g., 5-10 cm) in width. For even larger scale applications, such as robotic arms and the like, the lateral width of the elongated structure, unit/segment and socket may potentially vary between being many centimeters (e.g., 5-100 cm) to many hundreds of centimeters (e.g., 200-750 cm) or a fraction of a meter of more (e.g., greater than 1 meter) in width. While the width of an elongated structure may generally depend on the width of the individual units or segments, the length of the elongated structure would depend on the number of units or segments assembled, etc., together in series.

Since the sizes may vary widely depending on the application, the elongated structure may be described instead in terms of its relatively proportional sizes and dimensions. Assuming that the socket and ball of a unit/segment are consistent in size (e.g., part of a repeating pattern of units/segments of an elongated structure), then the socket cavity of the socket would be sized to receive a same or similarly sized ball of another unit/segment (i.e., have a same or similar spherical diameter) for the ball to fit tightly and securely within the socket. However, the socket will generally have a width dimension that is at least slightly greater (e.g., 5-20% greater, or about 10-20% greater) than the width or diameter of the corresponding ball to account for the circumferential sides of the socket to surround the ball and hold it in place. Thus, the ratio of the length dimensions of the socket and ball may vary between about 2:1 to about 1:2, or alternatively between about 1.5:1 to about 1:1.5, or alternatively about 1:1, respectively.

On the other hand, the connector length may vary in its length from a small fraction of the length(s) of the associated ball and/or socket to being longer than the length(s) of the associated ball and/or socket (e.g., the ratio between the length of the connector to the ball and/or socket may vary from about 1:10 (i.e., 10%) to about 3:1 (i.e., 300%), or about 1:2 to about 2:1, respectively), or they may be about the same (i.e., the ratio between the length of the connector to the ball and/or socket may be about 1:1 in length). A shorter connector may provide more strength and rigidity but less of a range of longitudinal movement, whereas a longer connector may provide less strength and rigidity but a greater range of longitudinal movement. The width of the connector may also vary but may preferably be only a small fraction of the width of the ball and/or socket (e.g., about 10-50% of the width(s) of the associated ball and/or socket). Again, a wider connector may provide more strength and rigidity but allow less lateral movement or rotation of the ball joint, whereas a narrower connector may provide less strength and rigidity but allow more lateral movement or rotation of the ball joint.

Figure 1B:
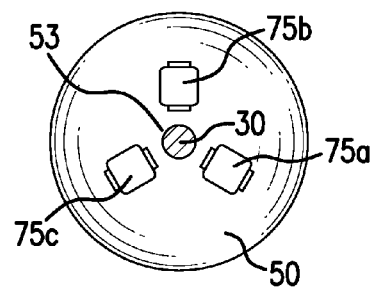
FIG. 1B is a cross-sectional view of the unit or segment in FIG. 1A from the perspective of plane 1-1.

The ball 50 is shown having a plurality of spaced-apart electromagnets 75a, 75b, 75c disposed therein (as seen more clearly in FIG. 1B). These electromagnets may be disposed "in or on" the ball 50 (i.e., on the surface and/or partially or fully embedded in or within the sphere of the ball 50) and function as part of an articulating actuator with a magnetic, etc., material(s) of a corresponding socket of another unit/segment coupled to the ball 50. Although it is generally preferred for the controlled electromagnets of the articulating actuator to be present in the ball and the corresponding piece(s) of magnetic material to be present in the socket, it is conceivable that this orientation could be reversed. With such a reversed orientation (having the electromagnets of the articulating actuator located in the socket instead), a controller (see below) that controls the operation of the electromagnets may also be located in the socket in that case.

An electromagnet of the present invention may include any suitable type and size of electromagnet known in the art. An electromagnet may be defined as generally understood in the art to mean any suitable device that uses electric current(s) to generate a magnetic force(s). For example, an electromagnet of the present invention may include a solenoid comprising a metal coil that receives a current, which may also surround a post or core that may be made of a ferromagnetic material or metal, such as iron, placed inside the coil of the solenoid to augment the generated magnetic field. However, any other suitable electromagnet now known or later developed in the art may also be used. The electromagnet may have a positive lead and a negative lead for receiving a current that may be switchable (i.e., to receive a current in opposing directions to switch the direction of the magnetic field accordingly).

Each of the components of a unit/segment defined according to FIG. 1 may generally be arranged symmetrically along a central axis 25 of the unit or segment 20 (i.e., with the central axis 25 passing through the geometric center of the sphere of the ball 50, longitudinally through the cross-sectional center of the connector 30, and co-linearly with a central axis or line of symmetry of the socket 60 that passes through the main opening of the socket cavity 70). The ball 50 and socket 60 may each generally be symmetrical in 360° around such a central axis 25 of the unit/segment 20 and/or its own line of symmetry. Accordingly, such a central axis 25 of the unit/segment 20 may also pass through the point(s) of attachment of the connector 30 to the ball 50 and/or socket 60. However, it is also conceivable for these components to not be perfectly aligned with such a central axis, and one or more of the components themselves may not be perfectly symmetrical in cross-sectional shape (i.e., some deviation is possible as long as the basic arrangement, order and function of components of the unit or segment is maintained).

According to some embodiments, however, a unit or segment (that may be used to make, etc., an elongated structure) may be defined differently. For example, each of the main components (e.g., the ball, connector, and socket) may alternatively be defined as a separate "unit," or a combination of two of these main components may be defined as a "unit." According to these alternative definition(s), an elongated structure may be assembled by a repeating pattern of those different components or "units." According to yet another set of embodiments, a ball and a socket joined or coupled together as a mated pair may be defined as part of the same "unit" perhaps in combination with one or more connector(s), or corresponding portions thereof (see, e.g., FIG. 4B). According to these latter embodiments with the ball joint defined as a "unit," respective lines of symmetry of the ball and socket may not be permanently aligned since they are able to pivot relative to each other as parts of the ball joint. However, a connector(s), or a portion thereof, fixedly attached to either the socket or the ball may have a longitudinal line through its cross-sectional center also aligned and co-linear with a line of symmetry of the socket or ball, respectively. However, it is conceivable for a connector(s), or a portion(s) thereof; to not be perfectly aligned with the respective line of symmetry of the socket or ball.

Continuing with the embodiment in FIG. 1A, a socket 60 of a unit or segment 20 may generally have a socket cavity 70 for receiving a ball of another unit or segment. The shape of the socket cavity 70 is defined by an inner surface 71 of the socket 60 facing the socket cavity 70. The socket 60 may have (i) a central portion or region where the connector 30 attaches to the socket 60 and where a central conductive or conducting portion 35 is located within the socket 60 and (ii) a circumferential side portion or region surrounding the sides of the socket cavity that is also between the central portion or region of the socket 60 and a main opening at a second end of the socket 60. Such a central portion or region and a circumferential side portion or region of a socket may refer vaguely to general portions or regions of the socket that may overlap, and there may not be a clearly defined boundary (structurally or otherwise) between them. The shape of the socket cavity 70 may generally be spherical and designed to be nearly or closely matched to the size and spherical shape of a ball of another unit or segment that may be inserted into the socket 60 in forming an elongated structure. Thus, the size of the socket 60 will be slightly or somewhat greater than the size or diameter of the socket cavity 70. The socket cavity 70 may generally have a main opening on a second side or end 64 of the socket 60 that is continuous with the socket cavity 70 for receiving a ball of another unit and to allow a ball of another unit inserted into the socket cavity 70 to freely rotate, turn, bend, etc., within a range of freedom of movement or motion inside the socket 60 (i.e., for a connector fixedly attached to the ball of the other unit/segment to have freedom of lateral movement within the main opening of the socket 60). The perimeter of the main opening may be bounded by a circumferential side portion of the socket at the second end 64 of the socket 60. The second side or end 64 may generally be on an opposing side or end of the socket 60 from a first side or end 62 of a socket 60 where a connector 30 attaches to the socket 60.

According to embodiments of the present invention, the socket will generally surround more than a half sphere (or hemisphere) of the socket cavity. In other words, regardless of whether the socket comprises a continuous piece or first and second (or more) portions, the shape of the socket cavity may generally have a volume and shape that is greater than a half-sphere to hold the ball inside the socket. In general, other than the main opening in the socket (at the second side or end of the socket), the socket cavity may otherwise be enclosed. However, it is conceivable that the socket could also have one or more additional minor holes or openings in one or more of its side(s) as long as the socket sufficiently surrounds the ball to hold it inside the socket. The socket cavity 70 may generally be at least slightly greater than one-half of a sphere in terms of its shape and volume to securely hold the ball of the other unit inside the socket 60 while allowing the ball to have some freedom of movement inside the socket 60 due to the main opening in the second side 64 of the socket 60. In other words, the size or diameter of the main opening in the second side 64 of the socket 60 may generally be smaller than the diameter of the ball of another unit or segment inserted into the socket 60, such that the ball cannot easily come loose and fall out of the socket 60. Indeed, the size of the main opening in the socket 60 may affect the range of angular bending movement or rotation of the ball joint. As explained further below, magnetic forces of an articulating actuator between a ball and socket coupled together may further reinforce the strength of attachment, connection, joining, etc., between them.

A socket may have a variety of sizes and shapes and/or may be made of one or more pieces or portions that may be joined, connected, attached, etc., together to form the socket. For example, as shown in FIG. 1A, a socket 60 may be composed on a first (main) portion 61 and a second portion 63 that may be connected, joined, etc., together along a continuous seam or boundary 65, which be within a plane (as shown in FIG. 1A) or along any other suitable non-planar line (not shown) around the periphery or circumference of the socket. The first portion 61 may include a first side or end 62 of the socket 60 and a circumferential side 68 having a generally increasing width or diameter closer to seam 65 and second portion 63 of socket 60. The second portion 63 of the socket 60 may have a circumferential side 69 with a generally decreasing width or diameter toward the main opening on the second side or end of the socket 60. In reference to the general terms used above for a socket, the first portion 61 of the socket 60 in FIG. 1 may include the central portion or region and much of the circumferential side portion or region of the socket 60, whereas the second portion 63 of the socket 60 in FIG. 1 may comprise only a narrow part of the circumferential side portion or region of the socket 60 nearest the main opening of the socket cavity 70.

A ball may be coupled, attached, connected, etc., to a corresponding socket of a ball joint by any suitable method. Such a method should generally allow for the placement, insertion, etc., of the ball inside the corresponding socket while also allowing the socket to hold the ball on the inside of the socket cavity. According to some embodiments, the assembly of units/segments into an elongated structure may be facilitated or enabled due to the socket being composed of a first portion and a second portion that may be assembled together after the ball is placed inside one of the two portions. For example, the first and second portions of the socket may be separate and divided where the socket cavity of the socket has a diameter approximately equal to the diameter of a ball of another unit that is to be inserted, placed, etc., into the socket. In other words, the first portion of the socket may have a semi-spherical cavity and an opening (continuous with the socket cavity) with the opening having a diameter approximately equal to that of the ball, such that the ball may be easily placed inside the socket cavity of the first portion of the socket without the sides or edge so the socket getting in the way. A ring-shaped second portion of the socket may then be fixedly attached, connected, etc., to the first portion (e.g., by screwing, snapping, gluing, fusing, etc., them together; fusion of the two portions together may be by chemical and/or heat treatment) to hold the two portions together and keep the ball inside the socket. The second portion of the socket may have a first end with a first opening and a second end with a second opening, the first and second openings being continuous with each other through the second portion of the socket. The first opening of the second portion may generally have a diameter that is approximately equal to that of the ball and the opening of the first portion, whereas the second opening may generally have a diameter that is less than the diameter of the ball and the opening of the first portion.

Thus, by attaching, etc., the second portion to the first portion (after the ball is placed inside the first portion), the second portion may function to hold the ball inside the socket due to the second portion of the socket tapering to a smaller diameter at its second opening (i.e., the main opening of the socket) than the diameter of the ball inside the socket. According to this example, the line of attachment, joint, seam, etc., between the respective circumferential side ends or edges of the first and second portions of the socket (that are joined together) may be generally oriented within a plane, although it is conceivable for those respective ends to be joined, etc., along a non-planar joint, seam, etc.

Other forms and methods for coupling, connecting, attaching, etc., a ball and a socket together to form a ball joint are also contemplated. For example, the socket may have an open (e.g., columnar or cone-like) shape that may have an outer portion(s) of the circumferential sides of the socket at or near the main opening of the socket cavity opened enough initially (e.g., in a columnar or outwardly angled shape) to receive the ball. Once the ball is placed, positioned, etc., inside the socket, the outer, circumferential side portions of the socket at or near the main opening of the socket cavity may then be turned inward (e.g., by crimping, squeezing, bending, etc., the circumferential side portions) to secure and hold the ball in place. According to some embodiments, the socket, or at least its circumferential side portion(s), may be at least partially made of one or more thermo-softening and/or thermo-setting plastic(s) or polymer(s) that may be reshaped upon heating to adopt a new shape that hardens once cooled. Thus, these materials may allow for the socket to more rigidly adopt the new shape around the ball inside the socket once the material is allowed to cool.

The socket, or at least its circumferential side portion(s), may instead be at least partially made of one or more memory material(s), such as a shape memory alloy(s) (SMAs), etc., that may allow for the passage of the ball into the socket due to the sides of the socket becoming temporarily pliable and moved out of the way (e.g., with the introduction of heat, etc.) to allow entry of the ball into the socket but then more rigidly return to its original shape once the heat, etc., is removed. According to other alternative embodiments, the ball may be forcefully snapped into the socket cavity due to the sides of the socket (i) moving out of the way momentarily to allow for the entry of the ball into the socket and (ii) then "snapping" of the sides of the socket back into their original shape once the ball is fully inside the socket cavity to hold the ball inside the socket. With these pliable- or snapping-type sockets, the sides of the socket may generally comprise multiple portions or one continuous piece.

To facilitate or enable such inward bending, crimping, etc., of the outer, circumferential side portion(s) of the socket at or near the main opening of the socket cavity, the circumferential sides of the socket may have one or more fissures or cut-outs (e.g., triangular or pie-shaped cut-outs, etc.) in the circumferential sides of the socket that may close upon and during such inward bending, crimping, etc., of those sides around a ball placed, etc., inside the socket. These one or more fissures or cut-outs in the sides of the socket may also be used to facilitate or enable a ball to be "snapped" into the socket (i.e., without causing the sides of the socket to become temporarily pliable—e.g., due to heating or other treatment). The one or more fissures or cut-outs in the sides of the socket may extend from a second end of the circumferential sides of the socket at the socket opening toward a central portion of the socket at or near the first end of the socket. For example, a plurality of such spaced-apart fissures or cut-outs may be present (e.g., equally spaced-apart) around the circumferential sides of the socket.

The socket may be made of a magnetic material, such as a ferromagnetic material/metal, or magnet as described further below, to function as part of the articulating actuator(s) of the respective ball joint. Alternatively (and more preferably), the socket may include one or more pieces of a magnetic material(s), such as a soft ferromagnetic material(s) or metal(s), and/or a permanent magnet(s) (collectively a "magnetic material" or "magnetic materials"), forming a constituent part(s) of the socket that functions as part of the articulating actuator(s) of the respective ball joint. In the latter case, the socket may also include other non-magnetic and/or non-metallic material(s), such as polymers, plastics, other metals, etc., including, for example, the memory and pliable material(s) mentioned above. A magnetic material(s) of the socket forming part of an articulating actuator(s) may include hard or permanent magnets and/or soft or temporary magnets that may be made of a metal and/or metal alloy (including possibly iron, cobalt, nickel and/or rare-earth metals), ceramics, polymers, etc., as understood in the art. These magnet(s) and/or magnetic material(s) may include a metal or metal alloy magnet or magnetic material, a ceramic or ferrite magnet, an alnico magnet, a neodymium magnet, a samarium cobalt magnet, a magnetic polymer, etc., as now known and understood or later developed in the art.

Generally, it may be preferable for such a ferromagnetic material(s) or metal(s), and/or a permanent or soft magnet(s), forming part of the socket (and also functioning as part of the articulating actuator of the respective ball joint) to be located and positioned at or near the second end of the socket and the main opening of the socket cavity, such that the one or more piece(s) of magnetic, etc., material(s) may be localized and sufficiently juxtaposed with the corresponding electromagnet(s) of the articulating actuator(s) in or on the ball of the ball joint. For example, according to a preferred embodiment, a socket may include an annular ring of a magnetic, ferromagnetic or magnetized material or magnet (i.e., magnetic material(s)) that may be positioned near the main opening at or near the second side/end of the socket to interact effectively with the electromagnet(s) of the articulating actuator(s) in or on a corresponding ball of the ball joint.

Where a plurality of magnetic, ferromagnetic or magnetized materials, metals or magnets are used for this purpose, they may be arranged in a discontinuous "ring" and/or evenly spaced-apart from each other in a regular pattern or array within a magnetic plane that may also be perpendicular to the central axis of the socket (and/or the unit or segment as a whole). Alternatively (and perhaps more preferably), such magnetic material(s) may instead be in the form of a continuous annular ring oriented within a magnetic plane that may also be perpendicular to the central axis of the socket (and/or the unit or segment as a whole). As shown for example in FIG. 1A, such an annular ring 67 of a magnetic material(s) may form, or at least be present within, a second portion 63 of a socket 60. Although less preferred, it is also conceivable for the magnetic material(s) of the socket to be one or more electromagnet(s) that may be maintained at a constant magnetic field and/or be controlled separately from the electromagnets of the ball.

As explained further below, such magnetized or magnetic material(s), etc., of a socket may work in combination with, and in response to, one or more controllable electromagnets of a ball inserted into the socket to cause the ball to rotate, turn, bend, etc., inside the socket in response to changing magnetic fields generated by the electromagnets. The one or more pieces of magnetic, ferromagnetic or magnetized material(s), metal(s) or magnet(s), etc., such as an annular ring of magnetic or ferromagnetic material(s), etc., may have a variety of different locations or positions on or within the socket but will may preferably be located at or near the second side or end of the socket at or near the main opening of the socket cavity. Generally, an annular ring of such magnetic, etc., material(s) in the socket may be preferred (over discrete spaced-apart pieces of such material(s)) as part of the articulating actuator(s) because an annular ring may interact with the corresponding electromagnets more continuously in different directions to allow for more even and predictable bending or turning movements of the joint in all radial or lateral directions.

The socket 60 shown in FIG. 1A has a first portion 61 with an outwardly sloping circumferential side 68 and a second portion 63 with an inwardly sloping circumferential side 69. However, according to other embodiments of the present invention, a socket of a unit or segment may instead be made of a continuous piece that surrounds the socket cavity (i.e., the central portion or region and the circumferential side portion or region of the socket may be composed of the same, continuous piece of material.

According to embodiments of the present invention, a socket may also have other shapes on its outer sides, ends or surfaces (e.g., unlike in FIG. 1A). For example, the outer sides or surfaces of the socket, including one or both of: (i) the first side/end and central portion, and/or (ii) the circumferential sides or surfaces extending to the second side/end of the socket, may be rounded or curved (i.e., without points of changing dimension or slope). This may be advantageous when a unit/segment (such as part of an elongated structure) is used in combination with a sheath (see below) that tightly surrounds the elongated structure and contacts the outer sides of the sockets of the elongated structure. Since the sockets will generally have the widest dimension of any of the unit components, the sheath will generally contact the outer sides of the socket (before any other component would come in contact with the sheath). With the sockets having a curved outer surface without a fixed form of contact with the sheath, the outer sides of the sockets of an elongated structure would thus be able to slide freely against the sheath in response to extension/contraction movement(s) and/or turning, bending, etc., movement relatively between the ball and socket of the ball joint, to avoid over-stretching or bunching of the sheath. Such rounded or curved outer sides of the socket may be present regardless of whether the socket is made of one continuous piece or two or more portions or pieces that may be assembled together.

Even with such freedom of movement between the sockets and the sheath, a tight fit with some friction may be present between the sides of the sockets and the inner surface of the sheath to maintain contact between them during movement. Thus, if the elongated structure is surrounded by a sheath having some resistance with the sides of the sockets, angular bending of the articulating actuator may still cause one side of the sheath (i.e., on the outside of the bend) to become relatively stretched or taut and the other side of the sheath (i.e., on the inside of the bend) to become more slack, loose or bunched (even with some sliding). As another alternative, however, the sheath may be fixedly attached, adhered, etc., at or to specific points or positions on the sockets, which may be more suitable if the sheath has additional slack between adjacent sockets of the elongated structure and/or if the sheath is made of a stretchable material. With such embodiments, any stretching or loosening of the sheath caused by the lateral or angular bending of a ball joint would presumably be greater because no relative sliding between the socket and sheath (with or without friction) would be allowed to occur due to the fixed attachments of the sheath. However, if there is sufficient slack in the sheath, then such stretching/loosening may not be noticeable.

The connector 30 is shown in FIG. 1A as a simple, elongated rod, pedestal, stem, or the like, physically linking the ball to the socket. However, as explained further below, the connector 30 may also serve as an electrically conductive link between the ball and socket components for passage of an electric current through the units/segments of an elongated structure. Thus, the connector may generally comprise electrically conductive portion(s). Additional conducting or conductive portions would also generally be present in a ball and/or socket attached etc., to the connector. As shown for example in FIG. 1A, the connector 30 may have a socket connecting portion 31 that interfaces with a central conducting or conductive portion 35 of the socket 60. As also further explained below, the central conductive portion 35 of the socket 60 may also have another interface or surface that contacts a conductive portion(s) of a ball of another unit/segment inside the socket 60.

Moreover, according to many embodiments, a connector between a ball and socket of a unit or segment (or between or linking adjacent units/segments) may also be or serve as a longitudinal actuator (in addition to being a physical link between the ball and socket components) that may be controllably extended or contracted to change the length of the connector between the ball and socket, which may be used to affect the overall length and/or shape of an elongated structure. Whether or not the connector includes a longitudinal actuator, the connector may be made of a rigid material (and with tight contacts between the sides of a piston/stem and the inside of the cylinder/stopper—see below) such that the connector can resist lateral bending movements. However, according to some embodiments, the connector may instead be made of a flexible material that may be return to its original shape after being bent by an external force. Such a flexible material of the connector(s) between a ball joint(s) of an elongated structure may allow the elongated structure to move with a whip-like action in response to movement—especially with more rapid movement.

Continuing with FIG. 1A, a ball 50 of a unit or segment 20 is further shown having a first side or end 51 and a second side or end 53, the second end 53 of the ball 50 being generally where the connector 30 attaches and links the ball 50 to the socket 60 of the unit/segment 20. A plurality of electromagnets 75 may also be located near the second end 53 of the ball 50. These electromagnets 75 may be integral to the ball 50 and function in tandem with corresponding magnetic or magnetized material(s) of a socket coupled to the ball 50 together as an articulating actuator(s) to cause rotation, bending, turning, etc., movement of the ball-and-socket joint. Thus, for a ball and a socket coupled together by the placement or insertion of the ball into the socket, the articulating actuator for the ball/socket would include the electromagnets of the ball along with the magnetic material(s), magnet(s), etc., of the socket.

The coupled ball and socket together with the articulating actuator may be referred to jointly as a mobile or motive ball joint. A "ball joint" may be generally defined as a ball and a socket coupled, attached, connected, etc., together by insertion, placement, etc., of the ball inside the socket, such that the ball is held inside the socket but is able to rotate, turn, bend, etc., inside the socket within a range(s) of relative laterally angular bending or turning and/or circumferentially rotational motion.

These electromagnets of the articulating actuator(s) may be positioned or placed in or on the ball (i.e., affixed to the surface of the ball and/or partially or fully placed, embedded, contained, etc., within the sphere of the ball). According to some embodiments, the electromagnets may be fully embedded within the sphere of the ball such that they do not interfere with the rotation or turning, bending, etc., of the ball inside the socket. The electromagnets and/or electromagnet plane (see below) of the ball may generally be placed, positioned, disposed, etc., near a second end of the ball (e.g., near the attachment of the connector to the ball), which may generally be on or in the hemisphere of the ball closest to (and including) the second end of the ball and/or the point of attachment, etc., of the connector to the ball). If the electromagnets of the ball only exert attractive forces on the corresponding magnetic, etc., material(s) of the socket, then the second end of the circumferential sides of the socket around the main opening of the socket may not move past the electromagnets (even if the electromagnets are fully embedded within the ball and out of the way) because the attractive forces cause the socket to move rotationally relative to the ball end at the site of the originating electromagnet(s). However, if one or more of the electromagnet(s) of the ball use repelling or repulsive forces, then the second end of the circumferential sides of the socket around the main opening of the socket may move past one or more of the electromagnet(s) due to the repulsive force on the opposite side of the ball joint.

Each of the electromagnets may be positioned such that their poles or dipole moments are approximately aligned with the connector attached to the ball. Each of the electromagnets may also be positioned such that their poles or dipole moments are approximately aligned with the central axis of the ball (and/or the unit/segment as a whole). For these purposes of the present invention in reference to the electromagnets of the ball, "approximately aligned" means within ±30°, or alternatively within ±15°, or alternatively within ±5°, relative to perfect alignment (i.e., 0°) of the poles of the electromagnet(s) with the central axis of the ball and/or the longitudinal axis of the connector attached, etc., to the ball.

The electromagnets in or on the ball may be spaced-apart in an "electromagnet plane" that may be approximately perpendicular to a central axis of the ball and the unit/segment as a whole. Although the plurality of electromagnets may be irregularly spaced-apart in or on the ball, the plurality of electromagnets within an electromagnet plane may preferably be evenly and symmetrically spaced-apart such that approximately the same amount of distance and/or angular degrees exists between adjacent electromagnets (i.e., equally spaced-apart). Such an equally spaced-apart arrangement of electromagnets may generally lead to more even and predictable laterally angular movements caused by the articulating actuator(s). For example, three equally spaced-apart electromagnets would each be separated from each of its neighbors by 120°, whereas four equally spaced-apart electromagnets would each be separated from each of its neighbors by 90°, and so on. For electromagnets positioned within an electromagnet plane, such angles between neighboring spaced-apart electromagnets may have the central axis of the ball (and/or the unit/segment as a whole) defining the vertex of those angles.

The plurality of electromagnets may include, for example, two, three four, five, six, seven, eight, nine or more electromagnets. Any suitable number of electromagnets is contemplated. With a greater number of electromagnets, there is greater complexity but also potentially increased or complex control and/or force of movement that may be caused by the articulating actuator(s). FIG. 1B provides a cross-sectional view of the unit/segment 20 in FIG. 1A through plane 1-1 looking toward the second side/end 53 of the ball 50. According to this embodiment, three equally spaced-apart electromagnets 75a, 75b, 75c are shown with their poles aligned with the connector 30 and the central axis 25 of the unit/segment 20.

An articulating actuator of a motive ball joint of the present invention may operate by magnetic forces and without a physical or mechanical connection. An articulating actuator may be defined as a set of spaced-apart electromagnets positioned in or on the ball (of a ball joint) in combination with a corresponding magnetic, ferromagnetic, or magnetized material(s), etc., of the socket (coupled to the ball of the ball joint) that magnetically interact(s) with the electromagnets of the ball to cause the ball joint to undergo and experience rotational and/or laterally angular bending, turning, etc., movements. Such a magnetically driven articulating actuator may provide a more simple construction and manner of operation, such as for miniaturization in its design and scale, and the bending or turning movement of the ball joint caused by the articulating actuator(s) may also be allowed to occur more freely due to its simpler design. By having a plurality of spaced-apart electromagnets in (or on) the ball, the direction and strength of bending or turning of the ball-and-socket joint may also be controlled by the strengths of the magnetic fields generated by each of the electromagnets. The magnetic field generated by each electromagnet of the ball may apply an attractive or repulsive force on the corresponding magnetic material(s), etc., of the socket. If there is a greater attractive force generated off to one side of a motive ball joint of an elongated structure, then the ball-and-socket joint will pivot in that direction, which may further cause the elongated structure to bend or turn at a lateral angle at that location.

As elaborated further below, each of the electromagnets may be powered with varying amounts, levels or intensities of current and power to affect the strength of the magnetic force generated by that electromagnet. At a given point in time, the net effect of all of the magnetic fields generated by the electromagnets of the ball may be described as a magnetic force vector that is applied to the magnetic material(s), etc., of the socket. Thus, if the electromagnets generate a magnetic field vector that applies a greater attractive force on the magnetic material(s), etc., on one side of the socket, the motive ball joint will rotate, bend, turn, etc., in that direction (i.e., toward the magnetic material(s), etc., on that side). If the motive ball joint is not already angularly positioned according to those combined magnetic forces, then the ball and/or socket of the motive ball joint will be caused to move, rotate, etc., to that angular position to achieve a state of equilibrium with those combined attraction/repulsion magnetic forces (exerted by the electromagnets of the ball on the magnetic material(s), etc., of the socket of the motive ball joint) at that given moment in time. A state of equilibrium will be achieved when the positioning of the magnetic material(s), etc., of the socket (i.e., by rotation, turning, etc., of the ball joint) results in the magnetic forces generated by the electromagnets being equally applied to the magnetic material(s), etc., of the socket due to the distances between the magnetic material(s), etc., and the electromagnets of the ball being adjusted accordingly (i.e., by such rotation, turning, etc., of the ball joint). The magnetic force vector generated by the combined forces of each of the electromagnets of the ball will have both a direction and a magnitude. The magnitude of the magnetic force vector may greatly determine the strength, force and/or speed of responsive angular bending to an equilibrated position as well as how strongly that positioning is maintained against an external force.

According to some embodiments, the magnetic material(s), etc., of the socket may include one or more permanent magnet(s), such as an annular ring composed of a permanent magnet. According to these embodiments, it is possible for the electromagnets to have a switchable polarity (e.g., able to generate a magnetic force from −100% to +100% with the ± indicating opposite directions or polarities of the electromagnet). Thus, each switchable electromagnet of the ball may be able to apply a range of attractive or repulsive forces on the permanent magnet(s) of the socket. This may increase how much force and/or speed of angular bending may be achieved with the motive ball joint as well as how strongly and resiliently its positioning is maintained. For example, having an attractive magnetic force on one side of the ball joint combined with a repulsive or repelling magnetic force on the opposite side of the joint may accentuate the amount of force and speed of angular bending caused to the joint in comparison to attractive forces alone (as well as how strongly or resiliently such a positioning may be maintained). However, using a combination of repelling and attractive forces on opposite sides of the motive ball joint may make partial angular movements difficult.

The ability to control the velocity and force of movement of the motive ball joint as well as the angular positioning of the ball joint are each key aspects of the invention. Each of the electromagnets (EMs) may be described as being powered on a scale form 0-100%. Thus, the same relative angular position would be achieved with a motive ball joint having an articulating actuator with three equally spaced-apart electromagnets in both of the following scenarios: (i) EM1=20%, EM2=40%, EM3=40%; and (ii) EM1=10%, EM2=20%, EM3=20%. In each case, the motive ball joint would angularly bend inwardly toward a position midway between EM2 and EM3 (assuming all of the forces are attractive). However, scenario (i) would generate a greater magnitude of force in causing the angular bending compared to scenario (ii), and scenario (i) would also hold that position more firmly. Scenario (i) would also result in a more forceful and rapid movement to the equilibrated position relative to scenario (ii).

It is further envisioned that there may be more than one type of electromagnet, and the electromagnets may be positioned in one or more different (electromagnet) planes. For example, there may be a group of one or more relatively strong electromagnets (for causing more forceful angular bending movements) combined with a group of one or more relatively weak electromagnets (for causing finer and more controlled movements). Thus, forceful movements may be combined with finer and more controlled or dexterous movements of the motive ball joint. The stronger electromagnets may be used to hold a general angular position of the motive ball joint, while the weaker electromagnets may be simultaneously used to cause finer and/or more dexterous movements of the motive ball joint that deviate from the angular position caused by the stronger electromagnets alone. It is also conceivable to control the rate of change in the amount of current passing through the electromagnet(s), and thus the strength of the magnetic field generated by it/them. A more gradual change in the amount of current delivered to the electromagnet(s) of the articulating actuator would cause its magnetic force to ramp up/down more gradually, which may lead to more gradual or slow movements, whereas a more rapid change in current may cause more abrupt or sudden movements.

The range of motion of a motive ball joint of the present invention may be limited by the presence of the connector and/or the positioning of the electromagnets. According to many embodiments, the socket may have unrestricted movement until it runs into the connector at the second end of the ball. According to some embodiments, an additional optional ring or other structure(s) may be present on or above the surface of the ball that may limit or restrict the range of angular bending movement of the motive ball joint. In fact, the electromagnets themselves may limit the rage of angular turning or bending motion if they protrude out from the surface of the ball; however, this may only be relevant if one or more repulsive electromagnet(s) are used since the circumferential ends or edges of the sides of the socket would not advance past the electromagnet(s) anyway if only attractive forces are used. Indeed, if only attractive forces are used, the electromagnets may still limit the range of rotational or angular bending, turning, etc., motion by the socket even if the electromagnet(s) are fully embedded within the sphere of the ball. Absent any such structures that would limit the range of motion, there may generally be a large degree of freedom in the range of angular movement of the motive ball joint. According to some embodiments, the motive ball joint may have a range of motion in each articulating plane (parallel with and passing through the central axis of the ball and unit/segment) that may be as much as almost ±180° (e.g., only restricted by the presence of the connector) if repulsive electromagnetic force(s) are used by the articulating actuator(s).

As will be explained further below, an electric current(s) may travel through each unit or segment to power the electromagnets and to possibly provide electrical power and current for a circuit, processor, controller, etc., that may be present within each unit/segment for controlling the timing and operation of the electromagnets. For example, with the embodiment in FIG. 1, the path of the current through a first unit/segment may be through electrically conductive portions of the socket and then through electrically conductive portion(s) of the connector and ball of the first unit/segment. The electrical current may be received by the socket from electrically conductive portion(s) of a ball of a second unit/segment coupled to the socket, and the electrical current reaching those conductive portions of the ball of the first unit/segment may then flow to a conductive portion(s) of a socket of yet another unit/segment coupled to the ball of the first unit/segment. Thus, as explained further below, an electrical may flow through the length of an elongated structure through such a central conductive channel.

According to embodiments of the present invention, a processor, circuitry, controller, etc., may be present inside the ball of the unit/segment to control the operation of the electromagnets. In addition to the current flowing through a "central channel" of the units/segments, current may also be a peripheral current flow through a sheath surrounding the series of connected units/segments forming an elongated structure. The current flowing through the central channel may be in one direction, whereas the current flowing through the sheath may be in the opposite direction to complete the circuit. A power source and/or an additional computer, controller, processor, circuitry, etc., may be present at one end (or at the base) of the elongated structure and connected to the current flows to and from the central channel and sheath. Thus, this additional computer, processor, etc., at one end of the elongated structure may control the overall shape and movements of the elongated structure over time by sending power and signals to the individual units/segments of the elongated structure.

Figure 2:
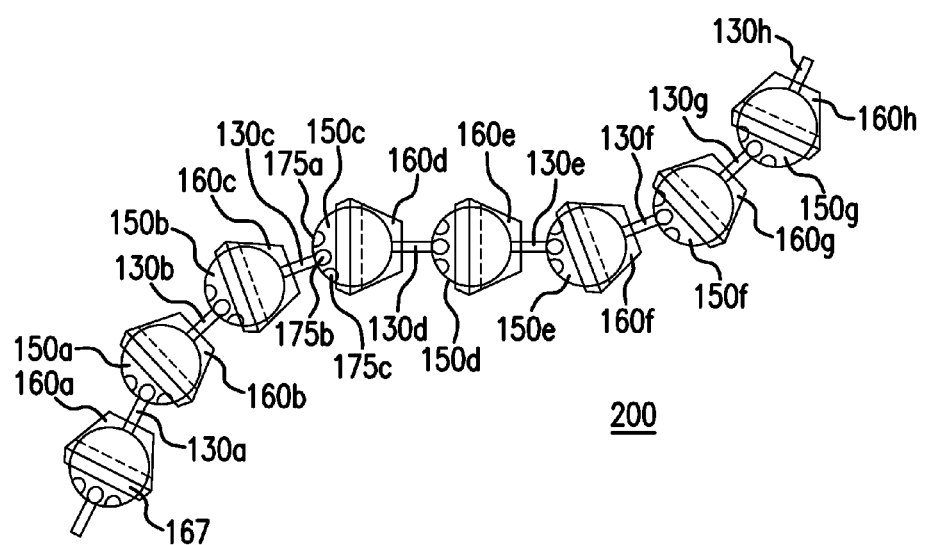
FIG. 2 is a view of an elongated structure according to an embodiment of the present invention composed of a plurality of individual units/segments having a motive ball joint.

As shown in FIG. 2, a plurality of units/segments may be assembled, coupled, connected, attached, joined, etc., together to form an elongated structure by inserting, placing, etc., the ball of one unit/segment into the socket of the next unit/segment in the series or chain of units/segments of an elongated structure 200. Each of the series of units comprises a socket 160, a connector 130, and a ball 150. Each unit or segment of the elongated structure 200 (labeled in alphabetical order in series) has an annular ring of magnetic or magnetized material in the socket (e.g., 167 in socket 160a) and a plurality of corresponding electromagnets 175 in the ball. Various bends and turns in the elongated structure may be achieved by magnetic force interactions between each coupled pair of a ball and a socket to cause the elongate structure to adopt, assume, take on, etc., a certain pose or shape. For example, the motive ball joint formed by the coupling of the socket 160d of one unit/segment and ball 150c of another unit/segment may be caused to bend or turn in one direction or off to one side (e.g., toward electromagnet 175c due to possibly a greater force of attraction to electromagnet 175c than to electromagnets 175a, 175b, or a stronger repelling force from electromagnet 175a). Thus, the elongated structure composed of a plurality of units or segments that may each controllably bend or turn in different directions may be referred to as a mobile or motive fiber, and the combination of all of these individually controlled movements may allow the mobile fiber to carry out complex, controlled, coordinated, dexterous, and articulated movements to cause the elongated structure or motive fiber to change in length, shape and surface tension, such as to perform work. The term "surface tension" may be in reference to bunching, tightening, etc., of a sheath in response to various movements, which may have some beneficial uses and applications.

As described above, a motive ball joint of the present invention may include an articulating actuator for controlling angular bending or turning movements as a result of magnetic force interactions between corresponding portions of the ball and socket of the joint, such as by changing the magnetic force generated by electromagnets present in the ball. In addition, each unit/segment may also have an associated longitudinal actuator positioned either within a unit/segment or between adjacent units/segments of an elongated structure. According to many embodiments of the present invention, the connector between the ball and socket of a unit/segment may also be a longitudinal actuator (in addition to being a physical link between the ball and socket components of a unit/segment). The longitudinal actuator of the connector may act by changing the distance between the ball and socket linked by the connector.

FIG. 2 shows an embodiment of the present invention for an elongated structure comprising a plurality of motive ball joint units or segments having a uniform size and shape coupled together in a series or chain. It is important to note, however, that the units or segments of the same elongated structure may have different sizes and shapes. Accordingly, transitional or adaptor units or segments are further contemplated having ball and socket components of different size and/or shape. For example, a ball of an adapter unit joined to a socket of the adapter unit by a connector may have a diameter that is smaller or larger than the diameter of the spherical socket cavity of the socket. Such an adaptor unit or segment may be used to accommodate a smaller or larger adjacent unit or segment in the series or chain. For example, the elongated structure may have a tapered construction with the sizes of the individual units/segments becoming smaller toward a distal end of the elongated structure. Such an elongated structure may thus comprise one or more units/segments having a larger socket connected to a smaller ball, such that the size of the socket of the next unit/segment in the series may be stepped down to a smaller size. According to these embodiments, units/segments closer to the proximal end or base of the elongated structure may be larger to support the full weight of the structure and to cause more major and forceful movements of the structure, whereas the units/segments closer to a more distal end of the structure may be involved in finer and/or more finessed, delicate, and/or dexterous movements of the structure near the distal end.

Other properties may also vary between units or segments of an elongated structure. For example, the length of the connector and/or the number, strength and/or positioning of the electromagnets may also vary (e.g., shorter connectors and/or stronger electromagnets may be used near the base and/or proximal end of the elongated structure to support a greater weight and force that may be required at or near the proximal end of the elongated structure). According to some embodiments, a connector of one or more units/segments of an elongated structure may also be kinked or bent to provide a more permanent bend or turn in the elongated structure, and/or one or more "connectors" may also include a split (i.e., a Y- or V-shaped connector from one socket to two different balls that may separately engage, couple etc., two different sockets. Such a splitter connection or split connector may allow for branching of the elongated structure.

Figure 3:
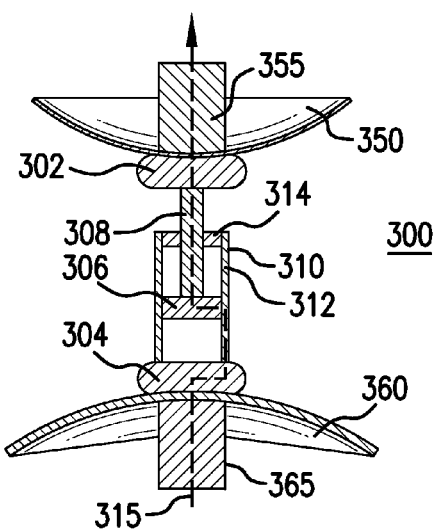
FIG. 3 is a cross-sectional view of a longitudinal actuator and connector according to an embodiment of the present invention physically linking a neighboring ball and joint.

According to embodiments of the present invention, a connector may comprise a longitudinal actuator having a piston and a cylinder that may be actuated or moved relative to each other by application of one or more force(s). According to these embodiments, the longitudinal actuator and connector may comprise (i) a first corresponding portion comprising a piston, which may be fixedly attached directly or indirectly to one of the components (i.e., the ball or socket), and (ii) a second corresponding portion comprising a cylinder, which may be fixedly attached directly or indirectly to the other component. According to the embodiment shown in FIG. 3, for example, the connector 300 may comprise a first base portion 302 fixedly attached to the ball 350 and a second base portion 304 fixedly attached to the socket 360 with the ball 350 and the socket 360 joined by the connector 300. With this embodiment, the connector 300 may further comprise: a piston 306 connected, attached, etc., to the first base portion 302 by a connecting arm or shaft 308, and a cylinder 310 having circumferential sides 312 connected, attached, etc., to the second base portion 304. The piston 306 is shown in FIG. 3 attached, etc., to a second end of the connecting arm 308, whereas the first end of the connecting arm 308 is shown attached, etc., to the first base portion 302. Likewise, a first end of the cylinder 310 is shown attached, etc., to the second base portion 304. According to some embodiments, the connector arm 308 may be integral with, and considered part of, the piston 306, or the connector arm 308 may be considered separate but integrally and fixedly linked with the piston 306. A stopper 314 is also shown in FIG. 3 placed inside or near a second end of the cylinder 310 having a hole through it for receiving the connecting arm 308 of the piston 306 through it. According to some embodiments, however, this stopper 314 may be integral and/or fused, glued, etc., with, or seamlessly part of, the cylinder 310.

Other arrangement(s) of the parts or portions of the longitudinal actuator are also envisioned. For example, the cylinder 310 may be wider than the second portion 304, fit around the second portion 304 and/or attach directly to the socket 360. The conducting arm 308 of the piston 306 may not only be attached to a conducting portion 355 of the ball 350, the conducting arm 308 may also be separate and/or insulated from the first portion 302 to avoid electrical contact with the first portion 302 (that might interfere with the electromagnet of the first portion 302). The overall orientation of the cylinder and piston of the longitudinal actuator may also be reversed with the cylinder connected directly or indirectly to the ball and the piston connected directly or indirectly to the socket.

When assembled, the connector (and longitudinal actuator) 300 in FIG. 3 would have the piston 306 placed or positioned inside the cylinder 310 with the piston 306 able to slide longitudinally through the cylinder 310 (e.g., with perhaps some or little or no friction) until a physical obstruction is reached. Some friction may necessarily exist due to contact between the sides of the piston 306 and the inner walls of the cylinder 310 as well as between the connecting arm 308 of the piston 306 and the bore hole in the stopper 314. These contacts may be required for electrical current to flow longitudinally through the connector and/or for the connector to provide sufficient strength, rigidity and resiliency (e.g., to avoid wobbling and/or bending movements in response to external forces). For example, physical obstructions that may limit the range of relative longitudinal movement (i.e., for both extension and contraction) of the longitudinal actuator (including the piston and cylinder) may include: (i) the second end of the cylinder 310 and/or the stopper 314 contacting the first base portion 302 (limiting contraction); (ii) the piston 306 contacting the second base portion 304 (limiting contraction); and/or (iii) the piston 306 contacting the stopper 314 (limiting extension).

To cause relative longitudinal movement between adjacent ball joints, embodiments of the present invention may utilize magnetic or other force(s) to cause the (i) extension/elongation or (ii) contraction/shortening of the longitudinal actuator between the adjacent ball joints. According to the embodiment in FIG. 3, the first base portion 302 may be an electromagnet, and the second base portion 304 may be a permanent magnet. The electromagnet of the first base portion 302 may be able to switch its polarity with have its poles (i.e., its dipole moment) regardless of its directional orientation approximately aligned with the longitudinal axis of the connector 300. Likewise, the permanent magnet of the second base portion 304 may have its poles (i.e., its dipole moment) approximately aligned with the longitudinal axis of the connector 300. The "longitudinal axis" of a connector or longitudinal actuator may be defined as being along its longest dimension and generally through the cross-sectional center of the connector and/or the points of contact of the connector to the ball and socket joined by the connector. However, according to other alternative embodiments, the first base portion 302 may instead be a permanent magnet, and the second base portion 304 may be a controllable electromagnet. It is further conceivable for both the first and second base portions 302, 304 to be electromagnets. However, if only one of the two base portions is an electromagnet, then the electromagnet would preferably be associated with the component (i.e., either the ball or the socket) that contains the processor, controller, circuitry, etc., for controlling the operation of the electromagnet. If present, such processing controls, etc., of the electromagnet may preferably be located in the ball (not the socket), and thus the first base portion 302 would also preferably be (or have) the electromagnet of the longitudinal actuator in such a case. However, it is important to note that the first and/or second base portions may not be present according to some alternative embodiments, and the piston and/or the stopper may each comprise a magnet or controllable electromagnet that may similarly operate in tandem.

Thus, according to the embodiment in FIG. 3, when the dipole moment of the magnetic field generated by the electromagnet of the first base portion 302 is in the same direction as the dipole moment of the permanent magnet of the second base portion 304, an attractive force is caused to exist between the first and second base portions 302, 304, which may cause them 302, 304 to move closer to each other (due to being drawn together) and thus contract and shorten the length of the connector (and longitudinal actuator) 300 as well as the distance between the ball 350 and socket 360 joined by the connector 300 (because the piston 306 and cylinder 310 are allowed to responsively slide past each other). Similarly, when the dipole moment of the magnetic field generated by the electromagnet of the first base portion 302 is in the opposite direction as the dipole moment of the permanent magnet of the second base portion 304, a repelling or repulsive force is caused to exist between the first and second base portions 302, 304, which may cause them 302, 304 to move further away from each other (due to being pushed apart) and thus extend and lengthen/elongate the connector (and longitudinal actuator) 300 as well as the distance between the ball 350 and socket 360 joined by the connector 300.

By having the longitudinal actuator (and connector) located and/or confined along or near a central axis of the ball and socket joined by the connector, any interference with the operation and movement of the articulating actuator caused by the longitudinal actuator (and connector) may be lessened or minimized (as opposed to having a more lateral position(s) involving one or more separate actuators). With a switchable polarity electromagnet, both attractive and repelling forces may be generated, and the strength or magnitude of the magnetic field generated by the electromagnet will greatly determine the force and/or speed with which the connector and longitudinal actuator extends or contracts in length.

Without any resistance or biasing, the longitudinal actuator might become either fully extended or fully contracted in response to a repulsive or attractive force, respectively. Therefore, biasing may be introduced to oppose the magnetic forces to allow a continuous set of positions or lengths of the linear or longitudinal actuator to be achieved. According to some embodiments, the space or volume within the cylinder between the piston and the base unit and/or the corresponding component attached directly or indirectly to the cylinder (if the base unit is absent) may contain air or gas that becomes compressed (i.e., pressurized) upon contraction of the longitudinal actuator and decompressed (i.e., depressurized) upon extension of the longitudinal actuator. As a result, the cylinder may have an atmospheric pressure when the piston is positioned midway within the cylinder, but as the magnetic force of the longitudinal electromagnet causes contraction of the longitudinal actuator, the increased pressure inside the cylinder resists further movement and thus requires greater magnetic force to overcome the increased pressure and cause further contraction. Likewise, as the magnetic force of the longitudinal electromagnet causes extension of the longitudinal actuator, the decreased pressure inside the cylinder resists further movement and thus requires a greater magnetic force to overcome the suction pressure and cause further extension.

Such an atmospheric pressure may also be present when the piston and cylinder is either fully extended or contracted to define a default position, and the electromagnet of the longitudinal actuator may thus be used to overcome that relaxed pressure state to cause extension or contraction of the longitudinal actuator despite the increased pressurization or depressurization that may result inside the cylinder. In such a case, a switchable polarity electromagnet may not be needed since the position and length of the longitudinal actuator is determined by the strength of the electromagnet in the same direction of polarity overcome the unidirectional biasing. In any of these cases, the positioning and length of the longitudinal actuator may be determined by the strength of the attractive or repulsive magnetic force generated by electromagnet against the biasing pressure.

According to another biasing approach, different polarities of magnets may be additionally incorporated into the piston and/or the stopper of the cylinder. The polarity of these magnets may be opposed with the nearest base portion such that the longitudinal actuator is biased to become extended in the absence of any other force being applied. However, as the strength of the electromagnet of one of the base portions is increased, it increasingly attracts the magnet of the other base portion to overcome the default state of extension. For example, in the arrangement in FIG. 3, if (i) the first base portion is an electromagnet that create a field in a first direction, (ii) the second base portion is a permanent magnet that creates an aligned field in the same direction (i.e., the first and second portions become subject to attractive magnetic forces to cause contraction), and (iii) the piston has a permanent magnet opposing the first direction of the permanent magnet of the second base portion, then the longitudinal actuator would be biased to become extended in a default state (when the electromagnet is turned off) due to the repulsive force between the magnet of the piston and the second base portion. Thus, an increasing magnetic field of the electromagnet of the first portion in such a case would eventually overcome those default magnetic forces to cause contraction of the longitudinal actuator. Any other variation of this approach is also possible (e.g., with the second portion comprising the electromagnet instead of the first portion, and/or the additional permanent magnet of the stopper or piston instead causing a default contracted state that is overcome by extension, etc.).

Especially with some sort of biasing in place, the strength of the magnetic field as well as the strength of the biasing force(s) may also greatly affect how firmly or weakly such connector length and/or distance between the ball and socket is maintained and held against an external force(s), with a stronger magnetic (and biasing) force causing a state of extension or contraction to be held in place more firmly against an outside force(s). The rate of extension or contraction may also be controlled not only by the strength or magnitude of the magnetic field generated by an electromagnet of a longitudinal actuator, but also by how quickly or gradually it transitions or changes to that level of magnetic strength. A more gradual change in the amount of current delivered to an electromagnet of the longitudinal actuator would cause its magnetic force to ramp up/down more gradually, which may lead to more gradual or slow extension/contraction movements, whereas a more rapid change in current may cause such movements to occur more abruptly or suddenly. It is further conceivable that the permanent magnet and/or the electromagnet(s) of the first and/or second base portion(s) may each comprise two or more magnets or electromagnets with varying positions and/or specialized functions.

According to some alternative embodiments, different non-magnetic forces may be utilized to cause extension or contraction of the longitudinal actuator. According to some of these embodiments, a similar piston and cylinder mechanism may be used, but the interior of the cylinder may be at least partially filled with a substance (e.g., an electroconvulsive gel, aerogel, etc.) that expands (or contracts) upon introduction of energy, such as heat or electricity, to the substance inside the cylinder (with the reverse expansion/contraction effect occurring upon dissipation or removal of such energy). Such an expansive substance or material may also employ carbon nanotubes (CNTs). Indeed, a material comprising an electroconvulsive gel, aerogel, etc., may further comprise, and/or be doped with, CNTs, such as to further enhance its/their conductive and/or expansive properties. According to another set of embodiments, a more cylindrical and/or elongated piece of metal attached to a connector arm may be used in place of a piston, and the cylinder may comprise a solenoid that surrounds at least a portion of the interior of the cylinder, such that different polarities and/or strengths of current through the solenoid coil of the cylinder may cause different directions and/or amounts of movement of the piston. Instead of the magnetic force acting at more of a distance as with the description above, a magnetic force acts more directly on the piston to cause its linear movement in either direction. Regardless of the exact mechanism, it may be generally preferred for the longitudinal actuator to be positioned and/or confined to a space along a central axis of the associated ball and socket.

As further shown in FIG. 3, the connector and longitudinal actuator 300 may also permit an electrical current to flow through it (e.g., along path indicated by arrow 315). The current may flow from a conducting or conductive portion 365 of the socket 360 and then through the second base portion 304, the sides 312 of the cylinder 310, the piston 306, connecting arm 308, first base portion 302 and then into a conducting or conductive portion 355 of the ball 350. These electrically conductive contacts would thus be necessarily maintained continuously throughout the range of extension or contraction of the connector and longitudinal actuator 300 (due to the sliding engagement between the piston and cylinder), such that a conductive channel or path is maintained during longitudinal movement for the flow of current of an electrical circuit. Although the first base portion 302 and the second base portion 304 may be attached to the ball 350 and the socket 360, respectively, by any suitable means, such as gluing, screwing, etc., such attachment(s) may require that sufficient contact be maintained or established between their electrically conductive portions to allow current to flow through them. Alternatively, however, current may bypass the first and/or second base portions and thus may not flow through one or both of those base portion(s) (e.g., the cylinder and/or connecting aim of the piston may bypass and/or be insulated from the respective base portion). Alternative path(s) for the flow of electricity through the connector 300 are also possible. For example, in reference to FIG. 3, the electric current may flow from the cylinder 310 through either the piston 306 and/or the stopper 314 of the cylinder 310 to reach the connecting arm 306 that may itself extend into direct or indirect electrical contact with a conductive portion 355 of the ball 350.

By having the piston-and-cylinder of the connector 300 function jointly as: (i) a physical connection, (ii) a channel for electric current, and (iii) a longitudinal actuator, the construction of the unit/segment and elongated structure is simplified, which may facilitate or enable its miniaturization into a smaller fiber. Although contact would need to be maintained between the piston 306 and the sides 312 of the cylinder 310 to allow continuous electric current to flow between them during relative movement of the piston/cylinder, different pressurization states may or may not be needed (and may not be present) inside the cylinder 310 between the piston 306 and the second base portion 304 in response to changes in volume inside the cylinder during movement of the piston. As explained above, pressurization/de-pressurization of the cylinder may be desirable and may actually be used as part of a biasing mechanism of the longitudinal actuator, such as to enable a moderate or middle (as well as more continuous) positioning and/or length of the longitudinal actuator. However, if such pressurization inside a cylinder is not used or preferred, then it may be avoided by introducing one or more holes, slots, etc. in the side of the cylinder to allow or equalization of pressure with the surroundings during longitudinal movement of the actuator.

In addition to the foregoing, an elongated structure comprising a plurality of units/segments coupled together may be further covered and/or surrounded by a sheath. If an elongated structure is covered or surrounded by a sheath, then extension of the longitudinal actuator may cause the sheath near the longitudinal actuator to become more stretched or taut, whereas contraction of the longitudinal actuator may cause the sheath nearby to become more slack, loose or bunched. Similar loosening/stretching may occur on opposite sides of the sheath in response to angular bending, turning, etc., of an articulating actuator—i.e., with the outer side of the bend becoming stretched and the inner side of the bend becoming bunched.

Figure 4A:
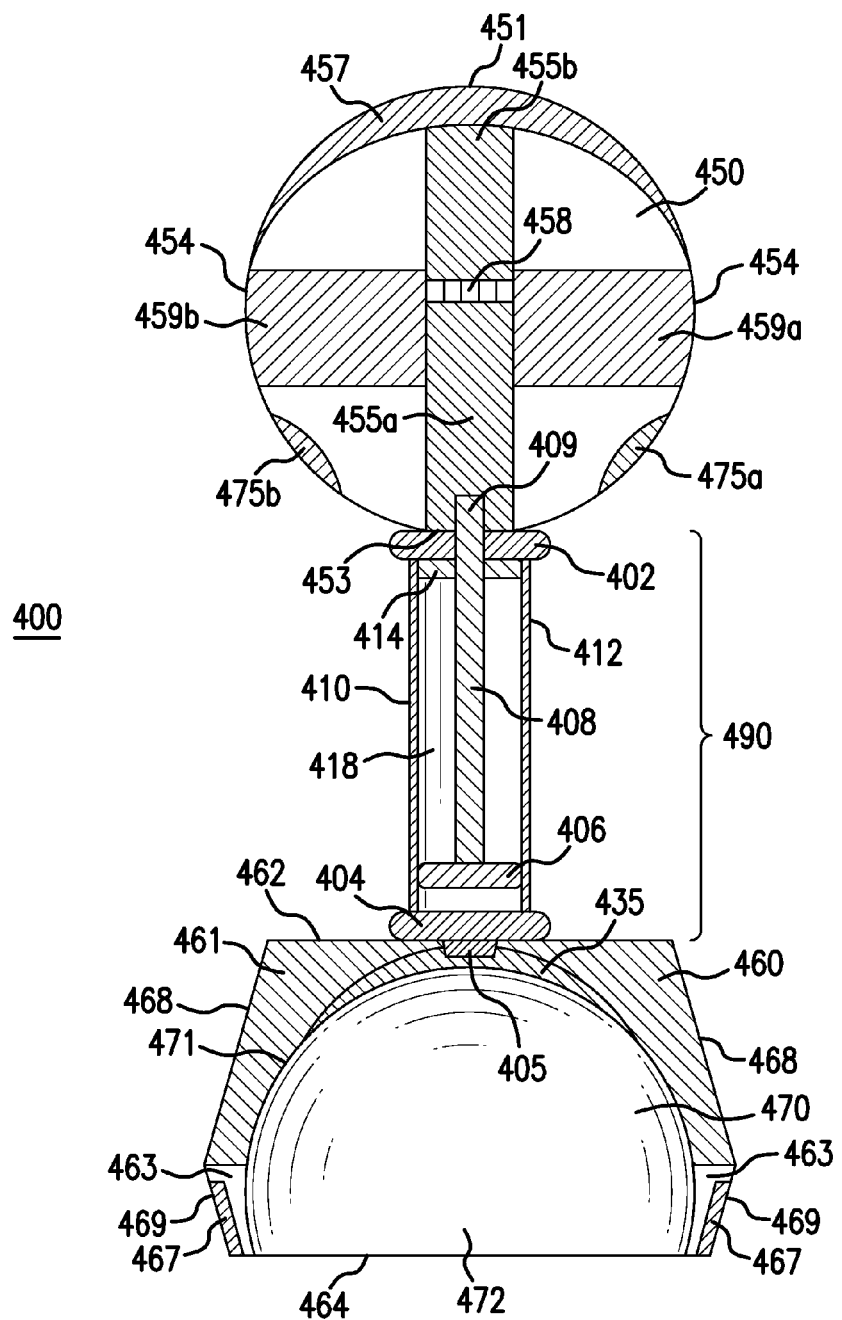
FIG. 4A is a cross-sectional view of a unit or segment according to an embodiment of the present invention having a ball, connector and socket.
Figure 4B:
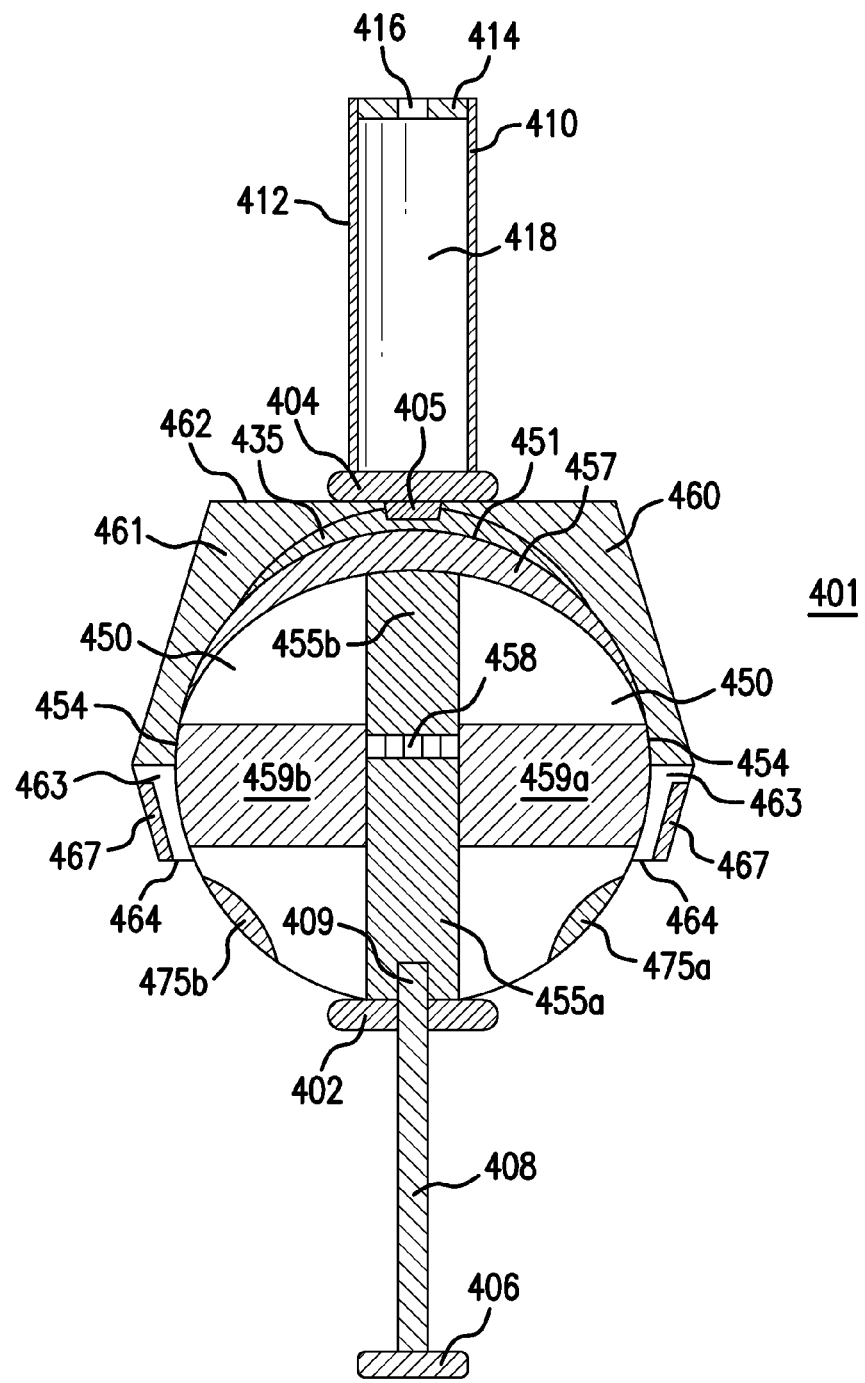
FIG. 4B is a cross-sectional view of a unit or segment according to an embodiment of the present invention similar to FIG. 1A but with the unit or segment defined differently as a node centered around a motive ball joint.

FIG. 4A provides a detailed, cross-sectional view of an embodiment of a unit or segment 400 of the present invention, and FIG. 4B shows a detailed, cross-sectional view of a nearly identical embodiment for a unit or segment 401 of the present invention defined differently. The unit/segment 401 in FIG. 4B may also be referred to as a node. Referring to FIG. 4A, a ball 450 and a socket 460 are shown physically linked together by a connector 490 that also functions as a longitudinal actuator. The connector 490 comprises: a piston 406 connected to the ball 450 via a connecting arm 408, and a cylinder 410 connected to the socket 460 indirectly by attachment of its sides 412 to the second base portion 404.

In FIG. 4A, the first end of the connecting arm 408 may be fixedly attached, etc., to the ball 450 by any suitably resilient means, such as by inserting a portion 409 of the connecting arm 408 into the ball 450 and/or force-fitting, gluing, screwing, bonding them together, etc., and the second end of the connecting arm 408 may be attached, etc., to the piston 406 by any suitably resilient means. Alternatively, the connecting arm may be fixedly but indirectly attached, etc., to the ball at or near a second end 453 of the ball 450 (opposite the first end 451) by its attachment to the first base portion 402, which may be directly connected, attached, etc., to the ball. However, the connecting arm 408 may preferably not directly contact (and/ or may be insulate from contact with) the first base portion 402 to avoid the current flowing through the connecting arm 408 from affecting the operation of an electromagnet inside or part of the first base portion 402. In either case, the connecting arm 408 may be inserted, screwed, bonded, glued, etc., into and/or through the first base portion 402.

A first end of the sides 412 of the cylinder 410 may be fixedly but indirectly attached, etc., to the socket 460 by its attachment to the second base portion 404, which may be directly connected, attached, etc., to the socket 460, such as by attachment of a projecting portion (or socket connecting portion) 405 of the second base portion 404 to the first side or end 462 of the socket 460. Alternatively, it is conceivable for the sides of the cylinder to be attached directly to the socket especially if the second base portion is smaller in diameter than the interior of the cylinder. Finally, the piston 406 and connecting arm 408 are coupled to the cylinder 410 by placement, etc., of the piston 406 inside the interior 410 of the cylinder 410 to form the connector (and longitudinal actuator) 490 of the unit/segment 400. The piston 406 may be further kept from coming out of the second end of the cylinder 410 due to the presence of a stopper 414 or the like at the second end of the cylinder 410. However, the connecting arm 408 of the piston 406 may be allowed to slide through a bore hole 416 in the stopper 414 that closely matches the width or diameter of the connecting arm 408.

As stated above, due to a tight or close fit between (i) the piston 406 and the sides 412 of the cylinder 410 and (ii) the stopper 414 and the connector arm 408, any undesirable angular movement, bending, turning, wobbling, etc., of the longitudinal actuator 490 in response to various lateral or bending forces may be resisted or avoided (e.g., to maintain the arrangement of components along or near a central axis of the unit/segment). However, the piston/connecting arm 406, 408 and the cylinder 410 of the longitudinal actuator and connector 490 are designed to move or slide longitudinally relative to each other, such that the distance between the ball 450 and the socket 460 may be extended or retracted/contracted accordingly.

Continuing with the embodiment in FIG. 4A, the ball 450 has a plurality of electromagnets 475 and several electrically conducting or conductive portions 455, 457, 459 disposed therein. As already described above, the strength of the magnetic field generated by the electromagnets 475 of the ball of a ball joint, such as electromagnets 475a, 475b, may be controlled and function as an articulating actuator (in conjunction with a magnetic, etc., material(s) of a corresponding socket coupled to the ball as part of the ball joint) to affect angular movement or bending, turning, etc., between the ball and socket. As will be explained further below, the electrically conductive portions 455, 457, 459 of the ball 450 may provide a path for the flow of electrical current(s) through the ball 450, which may be utilized not only to power the electromagnets, but also to power any logic circuits, processors, controllers, or the like, that may be present locally to control the operation of the plurality of electromagnets 475 of the articulating actuator present on and/or within the ball 450 and/or the electromagnet(s) of the longitudinal actuator that may form, or be present in, one of the base portions 402, 404. These conducting or conductive portions of the ball 450 may include a central conducting or conductive portion(s) 455, a lateral conducting or conductive portion(s) 459, and an apical conducting or conductive portion(s) 457, the central conductive portion(s) 455 and an apical conducting or conductive portion(s) 457 forming at least part of a central conducting channel, and the lateral conducting or conductive portion(s) 459 forming at least part of a lateral conducting channel. Each of these conducting (or conductive) portions of the ball or socket may comprise two or more conducting (or conductive) sub-portions that are electrically connected to each other.

The central conducting or conductive portion(s) 455 may carry current from the connector 490 (attached to ball 450), such as from the first base portion 402 and/or the connecting arm 408 of the piston 406, to the apical conducting or conductive portion(s) 457 of the ball 450 along a so-called "central channel." Finally, the apical conducting portion 457 may allow electrical current to flow from the central conducting portion 455 to a conducting portion of the socket of another unit/segment coupled to the ball 450. The apical conducting portion 455 may be separate and/or insulated from the lateral conducting portion(s) 459. Thus, the central conducting channel of a ball may electrically connect and span between at least a first outer position(s) (and/or a first outer surface(s)) on the outer surface of the ball (at or near a first end of the ball) and a second outer position(s) (and/or a second outer surface(s)) on the outer surface of the ball (at or near a second end of the ball), the second end being on the opposite side of the ball from the first end. The second end of the ball may also be at or near where a connector attaches to the ball. Thus, the second outer position(s) (and/or a second outer surface(s)) on the outer surface of the ball may in fact be (or include) a point(s) of attachment of a connector to the ball. Accordingly, the central conducting portion of a ball may electrically connect and span between the apical conducting portion and a second outer position(s) (and/or a second outer surface(s)) on the outer surface of the ball at or near a second end of the ball.

The lateral conducting portion(s) 459 of the ball 450 may allow current to flow from the central conducting portion 455 of the ball 450 to the socket of another unit/segment coupled to the ball 450 to form the ball joint. This lateral flow of electric current through the lateral conducting portions of the ball and socket may be referred to as the "perimeter channel" or "lateral channel." Thus, the lateral conducting channel of a ball may electrically connect and span between at least the central conducting channel of the ball and at least one lateral outer position(s) (and/or a lateral outer surface(s)) on an outer circumferential side surface of the ball. More preferably, the lateral conducting channel would electrically connect and span between the central conducting channel and (a) a continuous ring of an outer lateral surface around the circumferential side surface of the ball or (b) at least two or more spaced-apart lateral outer positions (or surfaces) positioned around the circumferential side surfaces of the ball. However, with each of these conducting portions, a reverse direction of electrical current flow than described is also possible.

For purposes of the present invention, the terms "electrical connection," "electrically connected" or "electrical communication" or the like, in reference to two or more component(s), portion(s), part(s), piece(s), etc., shall mean that there is a form of electrical connection(s) between them comprising an electrically conductive material(s), such that an electrical signal or current may flow between them. Such an "electrical connection," etc., exists even if there is a regulated or controlled gate, switch, gap, etc., that may affect the ability of an electrical signal or current may flow between them as long as there is at least the potential for such flow of an electrical signal or current via such a connection.

According to the embodiment in FIG. 4A, the socket 460 is shown having a first end 462, a second end 464 and circumferential or peripheral sides 468, 469. The socket 460 further has a socket cavity 470 defined by the inner surface 471 of the socket 460 with a main opening 472 at the second end 464 of the socket 460 that is continuous with the socket cavity 470. The perimeter of the main opening 472 is shown being bounded or defined by a circumferential side portion of the socket at a second end 464 of the socket 460. The socket 460 is further shown having a first portion 461 and a second portion 463 joined together along a seam. Similar to the embodiment in FIG. 1, the first portion 461 of the socket 460 may have a circumferential side 468 having a generally increasing width or diameter closer to the seam and the second portion 463 of the socket 460, and the second portion 463 of the socket 460 may also have a circumferential side 469 with a generally decreasing width or diameter toward the main opening 472 on the second side or end 646 of the socket 460.

A socket of the present invention may further include a central conducting (or conductive) portion and a lateral conducting (or conductive) portion that are separate and/or insulated from each other. According to the embodiment of the present invention in FIG. 4A, the central conducting portion 435 of the socket 460 may be between the connector 490 (e.g., the second base portion 404) and an apical conducting portion of a ball component of another unit/segment that is coupled to the socket 460. Thus, the central conducting portion of a socket may electrically connect and span between at least a first inner position(s) (and/or a first inner surface(s)) on the inner surface of the socket and a first outer position(s) (and/or a first outer surface(s)) on the outer surface of the socket at or near the first end and/or central portion of the socket. Since a connector may attach to the first end and/or central portion of the socket, the first outer position(s) (and/or the first outer surface(s)) on the outer surface of the socket may be a point(s) of attachment of a connector. On the other hand, the lateral conducting portion (shown for example as 463 in FIG. 4) of the socket 460 may span between and electrically connect a second inner position(s) (and/or a second inner surface(s)) on the inner surface of the socket and a second outer position(s) (and/or a second outer surface(s)) on the outer surface of the socket.

Since the central conducting portion and the lateral conducting portion of the socket may be separate and/or insulated from each other, the first inner and outer position(s)/surface(s) and the second inner and outer position(s)/surface(s) may also be separate and/or insulated from each other. According to some embodiments, the lateral conducting portion(s) may be near, juxtaposed with and/or within, or commensurate with, a second portion of the socket (if present). However, the second portion (if present) may also be separate and distinct from the lateral conducting portion, and/or the lateral conducting portion may form only part of the second portion of the socket.

In FIG. 4A, for example, the lateral conducting portion is shown within second portion 463 of socket 460. However, the lateral conducting portion may be separate and distinct from a second portion of the socket (if the socket is composed of assembled portions). Both the apical conducting portion of a ball and the central conducting portion of a socket may each be spread out over of an outer or inner surface such that the respective conducting portions of the ball and socket maintain contact with each other during rotation, turning, etc., of a motive ball joint comprising the ball and socket. For example, the apical conducing portion 457 of the ball 450 may be spread out over an area of the outer surface of the ball 450 at or near the first end or side 451 of the ball 450, and the central conducting portion 435 of the socket 460 may be spread out over an area of an inner surface 471 of the socket cavity 470 at or near the first side or end 462 of the socket 406.

Thus, the central conducting portion 435 of the socket 460 may be part of the "central channel" that carries electrical current from the apical conducting portion of a ball of another unit/segment (coupled to the socket 460) to the connector 490, such as the second base portion 404 and/or cylinder 410. The second base portion 404 of the connector 490 may optionally include an additional projecting portion (or socket connecting portion) 405 for insertion into the first side or end 462 of the socket 460 to physically strengthen its connection or attachment to the socket 460 and/or augment its electrical contact with the central conducting portion 435 of the socket 460. On the other hand, the lateral conducting portion(s) 463 of the socket 460 may carry electrical current from a lateral conducting portion(s) of a ball of another unit/segment (coupled to the socket 460) to an electrically conductive sheath surrounding the socket 460. However, with each of these conducting portions of the socket, a reverse direction of electrical current flow than described is also possible.

To summarize with the forgoing arrangement in FIG. 4A, a current (e.g., originating from a power source at a base or one end of an elongated structure) may flow through a "central channel" of an elongated structure according to embodiments of the present invention. More specifically, the current flowing in the central channel in a first unit/segment of an elongated structure may flow from a central conducting channel of a ball of the first unit/segment (i.e., a first ball) into an apical conducting portion of the first ball. The current may then pass through an apical conducting portion of the first ball and into a central conducting portion of a second unit/segment (i.e., a second socket). From there, the current may flow into and through the connector (i.e., longitudinal actuator) of the second unit/segment, such as via the second base portion, sides of the cylinder, piston and connecting arm, and first base portion. From the first base portion, the current may enter a central conducting portion of a ball of the second unit/segment (i.e., a second ball), and the order of flow into and through similar portions of a third unit/segment, and so on, may then be repeated multiple times depending on the number of units/segments in the elongated structure. Again, it is worth reiterating that a reverse direction of electrical current flow than described is also possible through these conductive portions.

To complete the electrical circuit (e.g., back to a base or end of the elongated structure where a power source may be located), a reverse flow of electrical current may take place through a tubular sheath surrounding, and in contact with, the elongated structure and the sockets of the each units/segments. However, the electrical current may flow in the opposite direction (e.g., out from a base or end of the elongated structure where a power source may be located) with a return flow of current through the central channel of the elongated structure.

Referring to FIG. 4A, the ball 450 further includes the lateral conducting portion(s) 459, such as for carrying current from the central channel (i.e., central conducting portion 455) to a circumferential side(s) 454 of the ball 450 so that it may contact a corresponding lateral conducting portion(s) of a socket coupled to the ball 450. According to some embodiments, the lateral conducting portion(s) 459 may maintain a default contact and electrical connection with the central conducting portion 455 of the ball 450. However, current flowing through the central channel may generally flow through the central conducting portion 455 of the ball 450 as a path of least resistance. Without any biasing of the current by a gate, switch, etc., the current in the central channel and central conducting portion 455 will generally not flow out of the central conducting portion(s) 455 and through the lateral conducting portion(s) 459 of the ball 450. However, a gate or switch 458 may be present in the path of the central channel to direct the flow of electric current through the lateral conducting portion(s) 459 of the ball 450. For example, if the gate or switch is closed, then the current will continue to generally flow through the central channel to the apical conducting portion 457 of the ball 450 and on to the central conducting portion of the socket of a motive ball joint coupled to the ball 450. However, if the gate or switch is opened, then the current may be at least partially, mostly or fully diverted through the lateral conducting portion(s) of the ball, through a lateral conducting portion(s) of a socket coupled to the ball 450, and to a sheath surrounding the motive ball joint. The gate or switch may include any suitable gate, switch etc., known in the art that may be used to control the flow of electric current through one of two possible paths and/or to open or close a circuit path. For example, such a gate or switch may comprise an insulated-gate transistor, an electromechanical switch that may be moved or actuated between open and closed positions, etc.

As shown in FIG. 4, the gate or switch may be in the path of the central channel such that electric current may flow preferentially though the central channel when the gate is closed but flow through a bypass lateral channel when the gate is opened. Alternatively, however, a gate or switch may be positioned between the conducting portion(s) of the central channel and the conducting portion(s) of the lateral channel, such that electricity may flow through the lateral channel when the gate is closed but flow through the central channel when the gate is open.

As explained further below, such a gate 458 in the path of the central channel may be used to divert or shunt some, much, most, nearly all, or all of the electrical current in the central channel to a logic control circuit, processor, controller, etc., and/or to one or more of the electromagnets 475 of the articulating actuator in the ball 450 via the lateral channel(s) inside the ball 450. Thus, the diverted flow of electric current may be used to provide power for, and/or control of, the electromagnets 475. The magnetic field generated by the electromagnet(s) may exert an attractive or repelling/repulsive force(s) on a magnetized or magnetic material 467 present on the socket 460 to cause relative angular bending, turning, etc., of the respective motive ball joint of the elongated structure. Thus, the amount of such attractive/repulsive force(s) generated by each electromagnet may be individually controlled.

FIG. 4B shows an embodiment of the present invention that is very similar in many ways to the embodiment shown in FIG. 4A. However, the unit or segment 401 in FIG. 4B is defined and/or shown differently with a ball 450 coupled to the socket 460 by placement, insertion, etc., of the ball 450 inside the socket 460. With this embodiment, the unit or segment 401 is defined as being centered around the motive ball joint (i.e., the combination of the ball 450 and the socket 460), which may be defined also in functional terms as a node. Essentially, the individual elements and features of the unit/segment/node in FIG. 4B are otherwise the same as, or very similar to, the corresponding elements and features of the embodiment in FIG. 4A and therefore will not be described again. However, reference to each unit, segment or node as being mainly a motive ball joint comprising a ball and socket coupled together is appropriate in many ways in reference to the control aspects of the present invention (according to many embodiments) since the computer, circuitry, processor(s), controller(s), etc. (not shown), may generally be present inside the ball 450 and used to control the rotation, turning, bending, etc., of the motive ball joint (i.e., the articulating actuator(s) or electromagnets of the motive ball joint) and/or the operation of the longitudinal actuator. Because the motive ball joint is made the centerpiece of the unit/segment/node shown in FIG. 4B, the connector (or longitudinal actuator) is shown in two separated parts including a piston 406/408 attached to the ball and a cylinder attached to the socket. A unit/segment/node might also be defined as a motive ball joint without the connector (or longitudinal actuator), in which case an elongated structure may comprise alternating units of motive ball joints and connectors (or longitudinal actuators).

Figure 5:
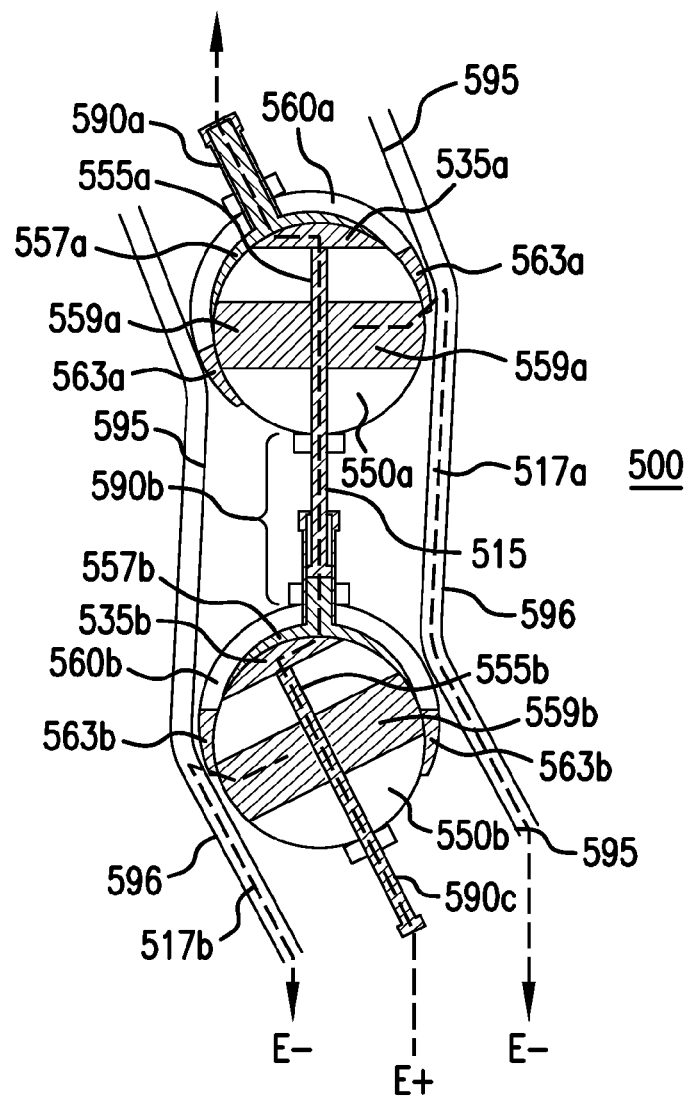
FIG. 5 is a cross sectional view of a pair of units/segments joined together into an elongated structure surrounded by a sheath according to an embodiment of the present invention.

According to embodiments of the present invention, a short segment of an elongated structure 500 is shown in FIG. 5 having two units/segments each comprising motive ball joints linked together by a plurality of connectors 590. Furthermore, a tubular sheath is shown surrounding the motive ball joints and connectors of the elongated structure in tight and/or close contact with the outer circumferential sides of the sockets 560. According to some embodiments, the sheath may comprise two concentric tubular sheaths (i.e., an inner sheath 595 and an outer sheath 596). The inner sheath 595 in contact with the sides of the socket may be electrically conductive, whereas the outer sheath 596 may or may not be conductive and may actually be an insulator and/or perform more protective functions (e.g., seal out moisture, dirt, etc. for the interior of the sheath). However, the sheath of the present invention may alternatively comprise a single tube or layer that is conductive. A first ball joint is shown having a central conducting portion 555a, a lateral conducting portion 559a, and an apical conducting portion 557a. Likewise, a second ball joint is also shown having a central conducting portion 555b, a lateral conducting portion 559b, and an apical conducting portion 557b. A first socket coupled to the first ball is further shown having a central conducting portion 535a and a lateral conducting portion 563a, and a second socket coupled to the second ball is further shown having a central conducting portion 535b and a lateral conducting portion 563b.

According to some embodiments, a sheath of the present invention having one or more layers or concentric tubes may further comprise and/or be reinforced by additional rigid components and/or greater thicknesses in the material(s) of the sheath at certain locations, such as next to mobile ball joints or other locations experiencing more frequent and/or forceful movements, forces or stresses, to avoid wear-and-tear particularly on the sheath over time. According to some embodiments, a sheath or additional layer may comprise an insulating material(s). An insulating sheath may be positioned concentrically inside the conductive sheath and/or insulating patches or layers may be placed at certain locations, to avoid unwanted electrical contacts with conductive portions of the ball joints and/or connectors that might short the circuit. According to these embodiments, such an additional protective layer(s), sheet(s) or sheath may have openings or holes at particular locations to allow the proper and intended contacts between the electrically conductive portion(s) of the socket and the conductive sheath to occur to complete the circuit with the central channel.

As can be seen in FIG. 5, a current 515 may flow continuously through a central channel of the elongated structure 500 in an outwardly direction (as indicated by arrow), and portions of the current 517 may be diverted and/or flow through lateral conducting portions 559a, 559b (of a ball) and the lateral conducting portions 563a, 563b (of a socket) toward an inner sheath 595, such that the diverted current 517 may flow though the inner sheath 595 in a reverse direction (as indicated by arrows) than the flow 515 in the central channel. The entire plane of the inner and/or outer sheath may be conductive or only portions, strips, wires, etc., of the inner and/or outer sheath may be conductive along the length of the tubular sheath as long as consistent contact between the conductive parts or portions of the sheath and the sides of the sockets are maintained to allow flow of current. For example, a first diverted current 517a is shown flowing through the first ball joint, and a second diverted current 517b is shown flowing through the second ball joint. As stated above, these diverted currents 517a, 517b may be used to both power and control the electromagnets of the respective ball joint and/or the electromagnet(s) of an associated connector (i.e., longitudinal actuator).

Figure 6A:
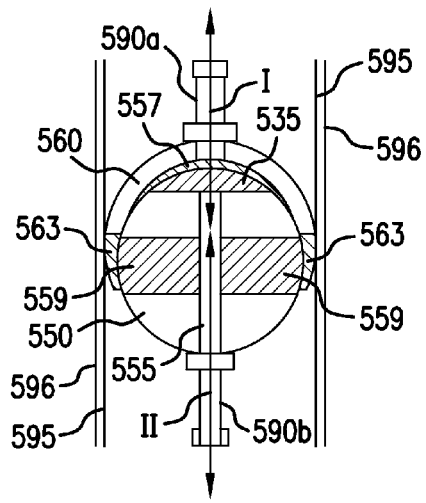
FIG. 6A is a cross-sectional view of a motive ball joint with a sheath according to an embodiment of the present invention with the ball and socket in a straight and aligned position.
Figure 6B:
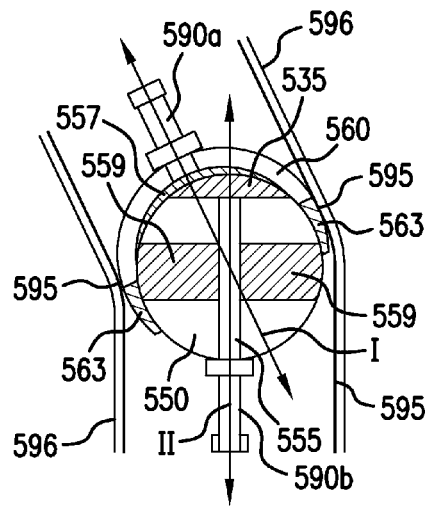
FIG. 6B is a cross-sectional view of the motive ball joint in FIG. 6A according to an embodiment of the present invention with the ball and socket rotated to a turned or bent position showing how electrical contact is maintained with the sheath.

As may be seen more clearly in reference to FIG. 6, contact is maintained between each of the corresponding conducting portions of the ball 450, socket 460 and sheath 495 over the range of angular movement of each motive ball joint. This allows for the continuous flow of electric current through the central and/or lateral channel(s) of the elongated structure to be maintained during movement. In FIG. 6A, the central axis (I) of the socket 460 is aligned with the central axis (II) of the ball 450. With this alignment, the motive ball joint is oriented straight. In FIG. 6B, however, the ball 450 and socket 460 of the motive ball joint are rotated, turned, bent, etc., relative to each other due to movements caused by the articulating actuators (i.e., electromagnets) as indicated by the angle formed between the central axes I, II of the socket 460 and ball 450, respectively. With this alignment, the sheath 495 may be concave and bent inward on one side 595a (i.e., on the side of the more closed angle due to the bending) and convex and bent outward on the other side 595b (i.e., on the side of the more open angle due to the bending). Despite this rotational bending movement of the ball joint, electrical contact is maintained between at least parts of the conductive portions of the central and lateral conducting channels. Since the side or lateral conducting portion(s) of the ball and socket are positioned circumferentially around the sides of the ball and socket, contact between them is maintained on one or their both side(s) during movement—i.e., even when contact is lost on one side, it may be maintained or gained on the other side.

Thus, the sheath 495 may experience different surface tensions depending on the direction and extent of angular movement or bending—i.e., the inward side of the sheath (with the more closed angle) may be more loose, soft and/or pliable with slack, whereas the outward side of the sheath (with the more closed angle) may be more taut, rigid and/or stretched. Extension or retraction, and the amount thereof, by a longitudinal actuator may also affect how stretched or loose is the sheath. Changing these surface tensions of various portions of the sheath is another feature that could be utilized for a particular application(s). Therefore, the sheath is not only functional as a conductor of electric current, it also provides strength and rigidity to the elongated fiber as well as a means for changing the surface tension of various portions of the sheath. The sheath further may also provide a protective shield for the ball, socket and connector components due to their containment on the inside of the sheath. The sheath may also participate with various sensory or other feedback functions.

A "central axis" of a ball of the present invention is defined as an axis fixed in relation to the structure of the ball that passes through the spherical center of the ball and also through one or more of the following: (i) a central conducting portion of the ball, (ii) the connector attached, etc., to the ball, and/or (iii) through (e.g., the center of) the apical conducting portion. A "central axis" of a socket of the present invention is defined as an axis fixed in relation to the structure of the socket that passes through one or more of the following: (i) a central conducting portion of the socket, (ii) the connector attached, etc., to the socket, (iii) the point of attachment, etc., for a connector to the socket, and/or (iv) through the main opening of the socket continuous with the socket cavity, such as through a center of the main opening of the socket.

Although FIGS. 4-6 generally show and depict the conductive portions of the ball and socket as being solid and/or having a simple columnar, band-like or block shape, many different shapes and arrangements of one or more conductive parts are possible for each conductive portion, and some of the conductive portions may simply include one or more conductive wires. In general, at least the parts and/or surfaces of the conductive portion(s) of either the ball or socket that interface and contact a conductive part or surface of another conductive portion(s) of a separate component may be required to span an area of the surface to maintain contact between them over the range of angular or rotational movement, bending, etc., of a motive ball joint including such a ball and socket.

According to embodiments of the present invention, an apical conductive portion of a ball may be required to cover an outer surface area on a first side of the ball, and the corresponding central conducting portion of a socket may be required to cover an inner surface area near a first side of a socket defining the socket cavity of the socket. Therefore, the areas of the corresponding inner and outer surfaces covered and/or spanned by the central conducting portion of the socket and the apical conduction portion of the ball will generally be sufficient and large enough such that the central conducting portion of the socket and the apical conduction portion of the ball maintain contact with each other over the full range of angular or bending movements of the motive ball joint comprising such a ball and socket. However, unless for some other reason, both of these conducting portions may be very thin since they generally do not need to extend be very deep into the respective ball or joint.

As for the area covered by these conducting portions, obstruction(s) that may ultimately limit the range of angular or bending movement of the ball joint may determine the shape and area of one or both of the surfaces covered by the central conducting portion of the socket and the apical conduction portion of the ball. For example, if the range of motion of the ball joint is limited by only by the main opening in the socket cavity, and the main opening is circular in shape within a plane perpendicular to a central axis of the socket, then the respective surface areas covered by the central conducting portion of the socket and the apical conduction portion of the ball may need to be circular in shape (or at least larger and fully encompassing such a circular area of the surface area of the respective component) to ensure that such contact is maintained. Furthermore, one or both of these conducting portion(s) may not be completely solid (e.g., radial, mesh-like, etc.) as long as at least some electrically conductive contact is maintained between them over the full range of angular movement of the joint.

The central conducting portion of the ball may include one or more conducting part(s) that may be separate with each part potentially having a wide variety of different sizes, shapes and arrangements. The central conducting portion of the ball may even simply be, or include, etc., one or more wires since the central conducting portion of the ball does not necessarily require a mating surface in sliding engagement with a conducting portion of another component of the ball joint. In fact, such a central conducting channel does not even need to be present entirely within the center of the central portions of the ball. However, the central conducting portion of the ball will need to be able to directly or indirectly contact at least a part of the lateral conducting channel of the ball as well as the apical conducting portion and the connector attached, etc., to the ball to allow current to flow through those contacts. Such a contact between the central and lateral conductive channels may be passive and/or controlled or regulated, such as by a gate a switch as discussed above.

The lateral conducting portion(s) of the ball may also include one or more conducting part(s) that may be separate with each part having potentially a wide variety of different sizes, shapes and arrangements. However, the lateral conducting portion(s) of the ball must have at least one part that spans and covers a sufficient area on a circumferential side(s) of the ball to maintain sliding engagement with a corresponding lateral conductive portion of the socket. But, the part(s) of the lateral conducting portion(s) of the ball between those surface covering part(s) and the one or more direct or indirect contact(s) with the central conducting portion of the ball may vary greatly in their size, shape, arrangement, etc. In fact, such part(s) of the lateral conducting portion(s) of the ball between those surface covering part(s) and the contact(s) with the central conducting portion of the ball may simply be, or include, etc., one or more wires.

Similarly to the other conducting portion(s), the lateral conducting portion of the socket may also include one or more conducting part(s) that may be separate with each part potentially having a wide variety of different shapes and sizes. However, the lateral conducting portion of the socket will need to be able to contact and bridge between the lateral conducting portion of the ball and the sheath surrounding the socket to allow electrical current to flow from the lateral conducting portion of the ball to the sheath, and vice versa, via the lateral conducting portion of the socket. However, the lateral conducting portion of the socket will need to be able to simultaneously maintain electrical contact with both the lateral conductive portion of the ball (on the inner surface of the socket) and the sheath (on the outer surface of the socket). Therefore, the lateral conducting portion of the socket may span and cover a sufficient area circumferentially on both the inner and/or outer surfaces of a portion of the socket at or near the second end of the socket (i.e., near the opening of the socket cavity) to maintain those required electrical contacts over the full range of angular movement of the ball joint.

One or more magnetic, ferromagnetic and/or magnetized material(s) may also be present circumferentially around a portion of the socket at or near the second end of the socket within the circumferential sides of the socket and preferably near the main opening of the socket cavity, such that these material(s) are sufficiently juxtaposed with the electromagnets of the ball (as part of the articulating actuator of the ball joint). For example, these magnetic, ferromagnetic and/or magnetized material(s) may comprise an annular ring or a plurality of separate pieces of such material(s) that is/are positioned circumferentially around and within the sides of the socket (i.e., to the side of the socket cavity). Such magnetic, ferromagnetic and/or magnetized material(s) of an articulating actuator may be positioned within, or juxtaposed with, the lateral conducting portion(s) of the socket. According to some embodiments, such magnetic, etc., materials and the lateral conductive portion(s) may actually be the same (i.e., the lateral conductive portion(s) may also serve as the magnetic, etc., materials(s) of the socket).

Given that the lateral conducting portion of the socket may likely be located in about the same location or nearby, the magnetic, ferromagnetic or magnetized material(s) (and/or possibly electromagnet(s)) of the articulating actuator as well as the lateral conducting portion(s) of the socket may potentially be placed, integrated, combined and/or intermingled together in a number of different ways. The magnetic, ferromagnetic or magnetized material(s) may be positioned within the lateral conducting portion of the socket, or the magnetic, ferromagnetic or magnetized material(s) may itself/themselves also be the lateral conducting portion of the socket (i.e., such magnetic, ferromagnetic or magnetized material(s) forming part of the articulating actuator may also be electrically conductive and thus further serve as the lateral conductive portion of the socket. For example, as shown in FIG. 4, an annular ring of magnetic material 467 may be positioned or located within the lateral conducting portion 463 of the socket 460, which also happens to be a second portion of the socket assembled together with a first portion of the socket or facilitate or enable the assembly of the ball joint. Alternatively, the lateral conducting portion of the socket may only be a thin coating over the surface of the socket and/or magnetic, ferromagnetic or magnetized material(s) of the articulating actuator. However, the positioning of the lateral conducting portion(s) of the socket and the magnetic, ferromagnetic or magnetized material(s) of the articulating actuator may be positioned independently of each other and regardless of whether the socket is generally composed of one continuous piece surrounding the socket cavity or assembled from two or more portions or pieces.

As introduced above, a unit, segment or node of the present invention may have a hardware computer(s), circuit(s)/circuitry, processor(s), controller(s), etc. (collectively a "controller"), to electronically and logically control the operation of the electromagnets of the articulating actuator and/or the longitudinal actuator associated with a particular ball joint (i.e., the timing and magnitude of current supplied to the respective electromagnet(s)), which may preferably be positioned within the ball itself. Such electronic processing control of the individual electromagnets of the actuator(s) by the controller may depend on the current supplied to the unit, segment or node via the central channel of the unit/segment or node and elongated structure. Such current may also be used by the unit, segment or node not only to store power and/or power the circuits that control the operation of the electromagnets, but also to power the electromagnets themselves to generate the magnetic field(s).

The general path of current flow through the center channel as well as through the lateral channels of each ball joint and the sheath surrounding the ball joints was described above. As also introduced above, a center channel gate or switch may also be present between first and second parts of the central conducting portion of the ball to regulate the flow of current through the central channel. If the gate or switch is closed, the current may generally continue to flow through the central channel. However, of the gate or switch is opened, then the current may be diverted to the lateral conducting portion(s) of the ball to deliver the current to the controller. The opening and closing of the gate or switch may itself be controlled, such as by the controller of a ball. For example, the gate or switch may be opened by breaking a connection and/or by introducing an electrical insulator in the path of the central channel. The nature of the electrical connections between (i) the control controller within a given node or ball joint and (ii) each electromagnet of the articulating actuator may depend on whether the electromagnet of the ball is a single or dual/switchable polarity electromagnet. If the electromagnet a single polarity electromagnet, then it is only capable of varying the intensity of magnetic force with the direction of the dipole moment of the electromagnet being constant (i.e., constantly in the same direction). In such a case, the leads between the processor, etc., and the electromagnet may be permanently established and/or connected such that only the intensity of the current may be modified to affect the strength of the magnetic field. On the other hand, a switchable polarity electromagnet may switch the direction as well as adjust the magnitude of the magnetic field generated by the electromagnet. Such a dual or switchable electromagnet may thus have switchable leads or connections to allow for the orientation of the field to be reversed by reversing the direction of the current through the electromagnet. Switching the leads may be carried out by a common switch for one or more of the electromagnets or individually for each of the magnets.

Such electrical current may contain not only electrical power but also signals or instructions for the operation of the individual electromagnet(s) at that node or ball joint in the elongated structure. Such signals or instructions may be received from a base unit, circuit, computer, processor, controller, etc. (collectively a "base computer"), that may be in electrical communication with the nodes and ball joints via the central and peripheral channels. Thus, the gate of a noted or ball joint may function to determine what signals are received by the processor, controller, etc., and when they are received. Alternatively, signals or instructions may be sent by wireless, Bluetooth®, cellular, optical or other non-wired means of communication (e.g., in place of control signals, instructions, etc., being sent by wired communication). In such a case, the circuitry of the control processor, etc., (in addition to any logic or control circuits) may further include a receiver for receiving such a non-wired signal. In any case, the controller may also have circuitry or a processing component for determining if any wired or wireless signals or instructions are in fact addressed to, and intended for, that particular node or mobile ball joint so that the control processor, etc., of that node or mobile ball joint knows or determines that it should respond accordingly. The controller may further include many typical components and features of a computing system, such as a central processing unit, storage, data bus, input-output (I/O), etc.

Figure 7:
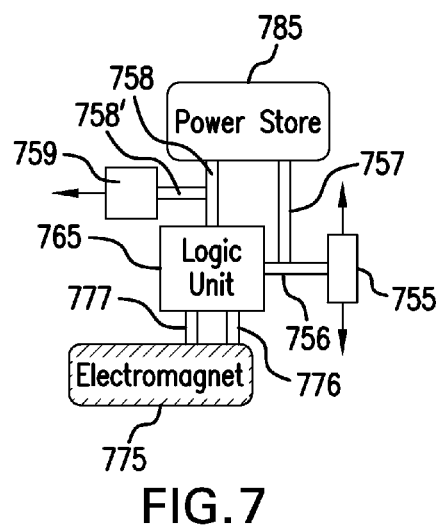
FIG. 7 is a diagram of a basic circuit with a logic controller or the like according to embodiments of the present invention for controlling the operation of electromagnet(s) of the articulating and/or longitudinal actuator(s)

According to some embodiments shown in FIG. 7, a basic circuit showing the functional positioning of the controller for a node or mobile ball joint is shown in relation to the various electrical connections for the flows of electric current through such node or mobile ball joint. Some, much, most, all, etc., of the current flowing through the central channel 755 may be diverted or shunted from the central channel 755 and flow through the lateral channel 759 instead. Such current may flow through a first connection 756, through the controller (labeled, for example, as a logic unit in the FIG. 765, and then through a second connection 758 including a spur 758' of the second connection 758 to reach the lateral channel 759, from which the lateral current may flow though socket and into the conductive sheath (not shown). A portion of the laterally diverted current may also be allowed to flow to a power store, such as a battery, capacitor, etc., that may store electrical potential for later use (e.g., to power one or more electromagnet(s) and/or the processor 765). The controller may use the diverted electrical current flowing through it to carry out its control of the operation of an electromagnet 775 (e.g., based on received control signals or instructions) by controlling the amount and polarity of power and current delivered to the electromagnet 775 via the first and second electromagnet connections 776, 777.

Figure 8:
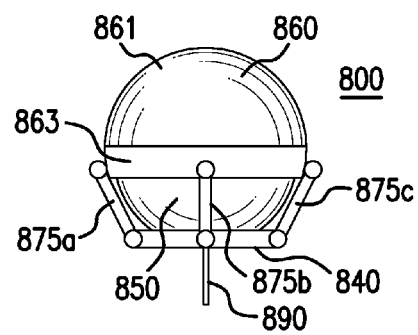
FIG. 8 is a side view of a ball joint according to embodiments of the present invention having an alternative type of articulating actuator.

FIG. 8 shows an alternative embodiment 800 of the present invention with a different type of mechanism for the articulating actuator relying on a plurality of physical linkages in place of the electromagnets around the ball joint. A plurality of articulating actuators 875 that physically link the socket 860 to a base portion 840 and hold the ball 850 of the ball joint in place are shown in simple diagrammatic fashion. Similarly to before, the socket 860 is shown with a first portion 861 and a second portion 863 that may contain the lateral conductive portion(s) of the socket 860 for contacting the sheath. Each of the articulating actuators may each include, for example, a linear piston-and-cylinder mechanism powered by other non-magnetic forces, such as bio-mechanical materials, such as electroconvulsive gels, etc., aerogels, etc., as understood in the art. Such articulating actuators 875 may power the angular bending, etc., movements of the mobile ball joint via mechanical forces generated by these materials in response to various energy inputs. For example, an electroconvulsive gel may be a substance that expands in response to an electric current. Some of these materials, such as aerogels, may be efficient at converting relatively small energy inputs into rapid and/or forceful expansion forces. By causing extension or retraction of each of the mechanical actuators 875 around the periphery of the ball joint, the angular position, bending, turning, etc., of the ball joint may be changed, moved, etc., in response. A connector and/or longitudinal actuator 890 is also shown that may link the ball 850 of the ball joint to a socket of another ball joint.

According to embodiments of the present invention, other components, units, segments, specialized devices, sensors, etc., may also be present in the series or chain of an elongated structure. For example, one or more sensors may be included to detect various conditions or parameters in the environment of the elongated structure, mobile fiber, etc., of the present invention. Sensors may be used, for example, to determine and/or detect inertial guidance or movement, position, temperature, pressure, mechanical forces, light, humidity, etc., or other physical or chemical information. These sensors may be present in the series or chain of units or segments and attached similarly by a ball and socket mechanism, or they may be positioned elsewhere, such as underneath the sheath, between adjacent units/segments, etc. An amplifier may also be present in the chain of units/segments for increasing, strengthening, retransmitting, restoring, etc., an electrical current(s) and/or signal(s) traveling down the central channel that may attenuate over the length of the elongated structure. A specialized unit/segment may also have one or more electromagnet(s) in or on the ball of a ball joint, such as a ball joint at a terminal end of the elongated structure, positioned and oriented with a tilted arrangement (i.e., with its poles not aligned with associated connector and/or central axis), such as to cause prolonged spinning or rotational movement of a socket of the ball joint coupled to the ball by magnetic interaction with magnetic, etc., material(s) of the socket. The socket may also have various other structure(s), attachment(s), blade(s), bit(s), etc., that may be used in drilling, cutting, sanding, etc., a work piece.

A wide variety of different uses and applications are possible with the elongated structures of the present invention. For example, according to embodiments of the present invention, a mobile or motive fiber or other elongated structure of the present invention may be used either alone or in conjunction with another device or apparatus for transportation or locomotion. Such an elongated structure may have a sheath(s) in addition to other possible structures. By undergoing an undulating or sinusoidal motion, perhaps in combination with controlled changes in weight distribution and/or the portions of the elongated structure that contact the ground or surface, the elongated structure may move across the ground or other surface in a slithering, snake-like or serpentine fashion. Such snake-like locomotion may also be deviated, such that the elongated structure may turn and change its general direction of movement. Other types of patterned movements, such as helical, etc., may also be used to propel movement of the elongated structure in a particular direction. As yet another example, an elongated structure may be propelled forward by having a variety of different turned or twisted shape with uneven weight distribution and/or only portions of the elongated structure contacting the ground or surface that may controllably change over time. With these embodiments, the elongated structure may move in an inchworm-like or peristaltic type of motion.

Such forms of locomotion with an elongated structure of the present invention may allow for more secret and silent movements that may also be difficult to detect due to the potentially small size of the elongated structure and/or its near silent manner or mode of operation due to having electrical components (possibly in addition to other chemical and/or magnetic components and processes) without a (noisier) combustion engine. These elongated structures may also be able to move across rough and uneven terrain and/or possess various additional functions, such as sensor(s), a camera, or other device(s) that may have uses for security, spying and/or military applications.

According to other embodiments of the present invention, one or more elongated structure(s) undergoing these undulating types of movements may also be used or harnessed to propel the movement of a vehicle or other apparatus to which it is attached or connected. For example, one or more of these elongated structures may be attached, etc., to the underside of a snowmobile or skis for locomotion on snow and ice. Larger vehicles, such as a car, etc., may also utilize these serpentine elongated structures in place of tires, which may also be able to operate in a superior fashion on unpaved and/or uneven terrains. Boats and other water vessels may also have such undulating elongated structures attached, etc., on their undersides, such as attached, etc., to the underside of the hull of a boat, to propel movement of the vessel over water. These applications may also operate with less energy loss due to friction as compared to other conventional types of movement, such as wheels, etc. When two or more elongated structures are used together on the underside of the same structure, they may be aligned with each other such that their forces of movement are constructive. It is also envisioned that such elongated structures may also be attached, etc., to the bottom of people's shoes as a form of locomotion that may be referred to as "snake skates" as a possible replacement for roller skates.

According to these embodiments, the elongated structure may be attached to the underside of the vehicle, skis, shoes, etc., using projections, tabs, slots, lugs, loops, or the like, that project down from the underside of those items and have a hole or opening through them for receiving the elongated structure. The elongated structure may fit tightly within the hole or opening of the projection, etc. Multiple such (spaced-apart) attachments on the underside of the vehicle, ski, shoe, etc., may be used to thread the same elongated structure through them to help secure them in place. Despite being held in place by these attachment(s), the elongated structure may be able to twist, rotate, writhe, etc., and even slide back and forth somewhat within and/or through the hole, opening, etc., of the projection, etc., to accommodate the movements of the elongated structure, particularly those greater coordinated movements between the attachments that may contact the ground and propel movement.

According to another specialized application, an elongated structure of the present invention may be used as a valve to control the manner and amount of flow of a fluid through a pliable tube or enclosure. According to some embodiments, the elongated structure may be attached, etc., along an inner or outer surface of the tube or enclosure (e.g., in a closed loop with the ends of the elongated structure meeting or extending past each other) within a plane that may be approximately perpendicular, or at least at a non-parallel angle, relative to the flow of the fluid through the tube or enclosure. By changing its shape and/or constricting the area inside the closed loop shape of the elongated structure, the tube or enclosure may have its cross-sectional shape and area changed or constricted accordingly. Thus, the elongated structure attached to the tube or enclosure may function as a valve to change and/or constrict the cross-sectional shape of the fluid flow through the tube or enclosure, such as to control the amount of fluid flowing through the valve of the tube or enclosure over time.

According to another set of applications with the elongated structures of the present invention, a mobile or motive fabric or sheet comprising one or more elongated structures is further provided to cause controlled movements of the fabric or sheet. The elongated structures may be weaved, knitted, felted, etc., or otherwise incorporated into the fabric by any suitable method, or they may be attached along their lateral side(s) to a separate fabric(s) or sheet(s) of material. In fact, a sheet or fabric may be made of a plurality of elongated structures weaved together, such as in a parallel and/or crossing pattern. Such a fabric or sheet may generally be separate from the sheath that may surround each of the elongated structure(s). The elongated structures incorporated or weaved, etc., into a fabric (or attached to another fabric or sheet) may comprise a plurality of elongated structures or fibers arranged approximately, generally, etc., in parallel with each other. In addition, a second set of elongated structures may also be present that are also arranged approximately, generally, etc., in parallel with each other, but transverse or perpendicular to the first set of elongated structures. This second set of elongated structures may also be incorporated or weaved, etc., into a fabric (e.g., weaved, etc., together with the first set of elongated structures) or attached to another fabric or sheet, which may be the same fabric or sheet attached, etc., to the first set of elongated structures. As with the elongated structures or mobile fibers, the force or speed of movement of a motive fabric or sheet of material of the present invention may be caused to move with varying amounts of speed or force depending on the strength of the forces generated by the actuators.

With such a motive fabric or sheet of material, the plane of the sheet or fabric may be caused to move in response to the individual movements of the elongated structures. Thus, the motive fabric or sheet may become self-animated and able to move and change its shape on its own. According to some embodiments, the motive fibers or elongated structures may be attached, etc., on both sides to two or more fabrics or sheets that may enclose the elongated structures or fibers and shield them from the environment, which may be useful, suitable and/or necessary for use in certain environments, such as corrosive or wet, underwater or liquid environments. When a motive fabric or sheet comprises one or more elongated structures attached on their lateral side(s) to a fabric or sheet, the fabric or sheet may be caused to become (i) stretched, taut, etc., in response to extension, stretching, outward bending, etc., or (ii) loose, slack, bunched, etc., in response to contraction, inward bending, etc. at different portions of the fabric or sheet due to the various movements of the elongated structures. This change in looseness/stretching (i.e., the change in flexibility) of the fabric or sheet of material may be described as a "surface tension" quality or property. This surface tension of a fabric or sheet of material may have different uses depending on the application. According to some embodiments, changing the surface tension of a sheet or fabric attached to the lateral side(s) of one or more elongated structures may cause the sheet or fabric to have a different appearance. Such changes in surface tension may thus be used with robotics to cause changes in facial expressions to create a more human-like expression and feel with the sheet/fabric attached to the plurality of elongated structures being used as a skin (e.g., on the face) of a robot. Much like the skin on the face of a human being, making a skin-like sheet/fabric (attached to the plurality of elongated structures) adopt a natural change of shape and expression, such changes in shape and surface tension would preferably be isovolumetric perhaps with some bunching in places to form creases, wrinkles, lines etc., much like a natural person's face in response to changes in expression. Such a natural human feel to the expression of a face of a robot may make tele-presence more real and personal by matching expressions of a robot to expressions of a human at a remote location (that may be detected by sensors or cameras placed on or observing the human at the remote location). A telemedicine application may allow the doctor or surgeon to interact more personably with a patient at a remote location while performing a remote procedure or consultation using a robot due to facial expressions and other indicia of emotions or other body language of the doctor or surgeon being communicated to, and presented in realistic fashion by, the robot. For example, the robot may turn and look at the patient and then express a smile or laugh in response to a story or joke told by the patient to match the actual response of the doctor at the remote location. These applications may also have a more direct use of making robots themselves seem more personable and human-like or to express emotion more believably.

A number of different applications are envisioned using a motive fabric of the present invention. According to some embodiments, the motive fabric or sheet of material may be caused to move in an undulating pattern in generally one direction to cause movement or flow of a fluid or air (e.g., by pushing the air or fluid flow over its surface). Two or more motive fabrics or sheets may be aligned in parallel and sufficiently juxtaposed to coordinate the movement or flow of a volume(s) of fluid or air. The separate motive fabrics or sheets may move in the same or similar undulating pattern to maximize their constructive coordination in causing the air/fluid flow. This type of arrangement of motive fabrics or sheets may be used as a fan to cause the movement of air, or as a jet or submarine turbine to move a fluid, such as air or water, etc. The motive fabric or sheet may have a variety of different sizes and shapes depending on the application including rectangular, square, triangular, curved, etc.

Figure 9A:
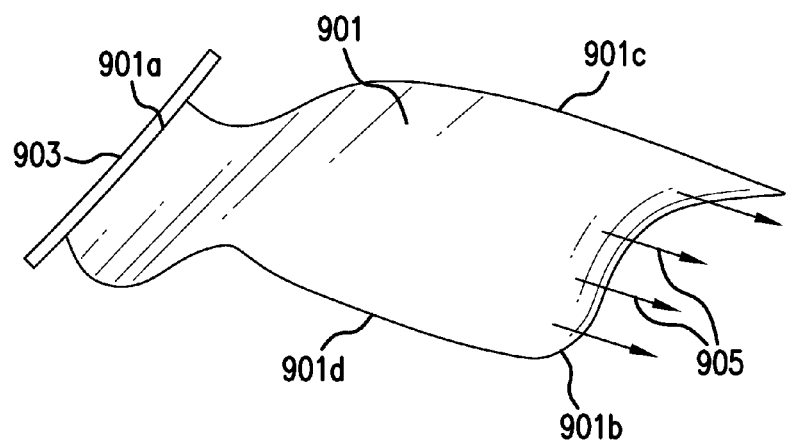
FIG. 9A is a perspective view of a motive fabric or sheet attached to a rod according to an embodiment of the present invention.

In a simpler arrangement for a fan, a single motive fabric or sheet may be attached along one of its ends to a rod to help maintain an extended shape. The motive fabric or sheet may be caused to move in an undulating pattern with the fabric/sheet moving in waves originating at or near the end of the fabric/sheet nearest the rod and traveling or propagating distally therefrom to the opposite end of the fabric/sheet. For example, as shown in FIG. 9A, a motive fabric or sheet 901 is shown attached to a rod 903 at or by its proximal end 901a, whereas the distal end 901b of the fabric/sheet 901 is shown free. However, both the proximal and distal ends may be attached to different rods or other structures depending on the application. Due to changing undulation of the motive sheet/fabric undulating along its proximal-distal axis, a fluid, air or gas is caused to flow distally (see arrows 905) due to the forces applied to the air, fluid, etc., by the surface of the motive fabric/sheet 901 during its movement. According to many of these embodiments, the fan comprising the motive sheet/fabric 901 in FIG. 9A may move with a series of waves or peaks that propagate along a propagation axis, which may be along a length or other dimension of the sheet/fabric 901 from its proximal end 901a (near its attachment to the rod 903) to its distal end 901b (i.e., along a proximal-to-distal axis). These waves or peaks may be constant at any given point in time across the width or other dimension of the sheet/fabric 901 that is perpendicular to the axis of propagation of the travelling wave movements (e.g., perpendicular to the proximal-distal axis of the sheet/fabric between the lateral sides 901c, 901d of the sheet fabric 901 and/or perpendicular to the lengthwise axis of the rod 903 and/or the line of attachment of the sheet/fabric 901 to the rod or any other structure).

Figure 9B:
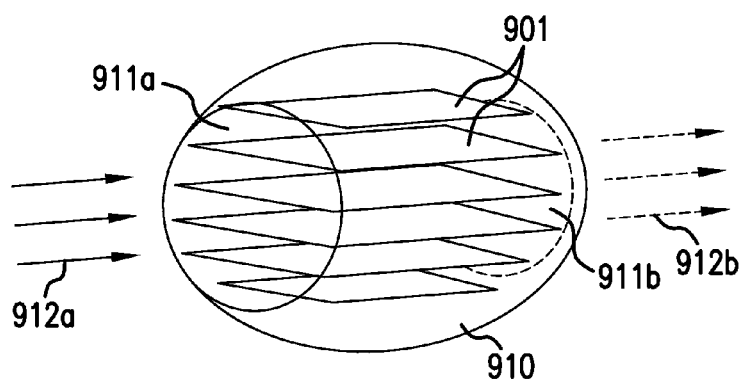
FIG. 9B is a perspective view of a plurality of aligned motive fabrics or sheets within an enclosure to form a fan or turbine according to an embodiment of the present invention.
Figure 9C:
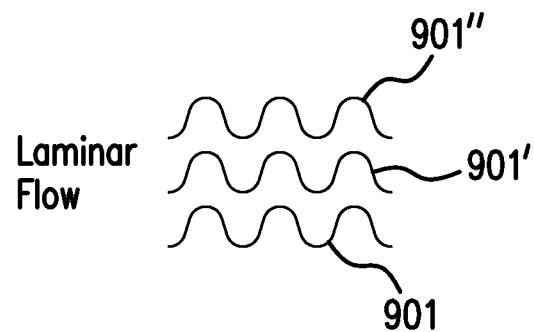
FIG. 9C is a simplified cross-sectional view of a plurality of aligned motive fabrics or sheets according to an embodiment of the present invention undergoing undulating movements to cause a laminar flow.
Figure 9D:
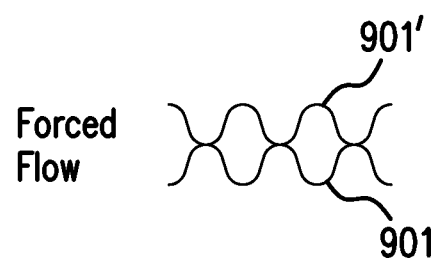
FIG. 9D is a simplified cross-sectional view of a plurality of aligned motive fabrics or sheets according to an embodiment of the present invention undergoing undulating movements to cause a forced flow.

With two or more juxtaposed motive fabrics/sheets, such fluid or air flows may be either (i) forced or pulsed, or (ii) laminar, depending on the manner of coordinated operation of the parallel motive sheets or fabrics. Each of these fabrics/sheets may be attached to their own rod or other structure (or different portions of the same structure) to help to hold them in place and in alignment or constructive positioning with the other sheets/fabrics). For example as shown in FIG. 9C in simple cross-section, if the multiple juxtaposed motive fibers/fabrics 901, 901', 901" move in unison (i.e., with their amplitudes aligned along the propagation axis of the fibers/fabrics over time), laminar flow of a fluid may be generated. A fan operating on smooth laminar flow may have applicability in clean rooms for surgical, bioengineering or semiconductor operations. However, as shown for example in FIG. 9D, if the multiple juxtaposed motive fibers/fabrics 901, 901' move in opposition to each other (i.e., with the amplitudes of neighboring fabrics/sheets offset from each other by 180° in phase (i.e., in anti-phase) along the propagation axis of the fibers/fabrics over time), a more forced flow of a fluid may be generated. Such a forced flow of fluid or air may be more suitable propulsion systems to cause movement of a vessel. Other relative wave patterns of movement of the juxtaposed sheets/fabrics may also be used that may be more varied or irregular. Fans or turbines operating by these coordinated wave-like movements of the juxtaposed motive fabrics/sheets may provide a more precise and tailored control of air or fluid flow (as compared for example to a conventional propeller-type fan) since the exact wave patterns and their timing may be adjusted or fine-tuned by changing the mathematical function(s) that define their movement.

According to embodiments of the present invention, a plurality of motive fabrics/sheets may be juxtaposed and constructively aligned with each other (e.g., with at least one of their respective ends, such as their proximal ends, approximately in parallel). As stated above, such a close alignment of sheets/fabrics may form a fan or turbine that may be used to move or propel a fluid, such as air or water, in a particular direction. For example, as shown in FIG. 9B, the closely aligned fabrics/sheets 901 may be present within an enclosure 910 to form a turbine having a proximal opening 911a and a distal opening 911b in fluid communication with each other to allow for the fluid to flow through it. Again, the waving motion of the fabrics/sheets 901 may cause the flow of fluid 912a, 912b through the turbine, and the enclosure 910 of the turbine may actually function to assist or reinforce the forceful movement of the fluid through the turbine caused by the moving fabrics/sheets 901.

Such a turbine structure shown in simple conceptual terms in FIG. 9B may be incorporated into ships, vessels, submarines or jets as a replacement for current propulsion systems. The electric propulsion systems of the present invention may provide a more efficient and eco-friendly alternative to current jet or other propulsion systems relying on combustion of fossil fuels. By using silent or quiet electrically powered technology, such propulsion systems may also provide less noise pollution and/or have less noticeable or recognizable sound signatures for stealth operations that may even be modeled and disguised to match wave patterns, frequencies or sounds that naturally exist in the environment or ocean.

According to a related application, a plurality of elongated structures of the present invention may operate in tandem as a motive "flipper" or fin for propelled movement through a liquid, such as water. The plurality of elongated structures may be placed or positioned inside an enclosure comprising two opposing sheets or fabrics that may be sealed together to shield and sequester the elongated structures form the environment. By causing oscillating or undulating movements of the flipper underwater (much like the tailfin of a fish), a boat or other vessel (or even a diver having a device comprising such a flipper) may be propelled forward. Thus, such a flipper propulsion may replace existing boat motors. Again, such propulsion may be relatively silent and efficient and may be patterned to mimic movements of sea life, such as whales or other natural phenomenon, without a distinguishable sonar signature. Multiple flippers may also be attached to a ship or vessel, such as with different placements and alignments, and used in combination for potentially more forceful and/or controlled movements of the vessel.

According to another application, a plurality of elongated structures may be approximately aligned along the longitudinal axis of an elongated tube and attached, etc., to an inner or outer surface of the tube (or between two concentric tubes). According to these embodiments, coordinated movements of the elongated structures may cause a peristaltic pumping action by the tube with waves of motion causing a forced flow of fluid through the tube. Such a tube would comprise a self-pumping tube that does not require a separate pump. Such an application may be used, for example, as a fire hose with one end placed in a body of water and the other nozzle end pointed toward the fire, or for industrial applications to move fluids or water through a plant, etc. According to yet another embodiment, a motive fabric/sheet or flipper-like device comprising a plurality of elongated structures may be used for aerospace applications to direct the flow air around a plane, etc. For example, such a flipper-like structure may be used in place of ailerons currently used on the wings of planes to provide for more control and smooth or gradual transitions changes on the path of air flow (in contrast with presently jointed aileron structures), which may provide for more precise control and less interrupted airflow or drag on the plane. The wing itself may also comprise elongated structures of the present invention and may also be adjusted in its shape for different flights.

According to yet another set of embodiments, motive structures or fabrics/sheets may also be used to form household or office furniture or other objects. These motive structures or fabrics/sheets used to make furniture may be able to move themselves (e.g., by end-to-end slinky movements) over a distance to a desired location and then assume a particular rigid pose or shape to serve as a chair, table, cot, nightstand, etc. Such self-moving furniture may also move out of the way (e.g., toward a wall or into a closet) when they are no longer needed for storage and/or to get out of the way. Such movable furniture may also be used to transform a room from one purpose to another. Depending on the strengths of the actuators the static rigidity of all or a portion of the particular pose or shape may be adjusted, such that the pose or shape (e.g., of a chair), or any portion thereof, may be made more or less rigid or flexible. Indeed, a weakening of the static strength of one or more of the elongated structures forming part of the posable structure or shape may it more flexible, springy and comfortable to sit or lie down in it. Such a posable piece of furniture may also be tailored to provide a desired pattern and amount of ergonomic support, such as back support, for a user. A central controller of the motive fabric/sheet/ structure may send the instructions or signals, which the central controller may acquire from the interne, database, etc., via a wireless, cellular or other type of connection, to the individual units/segments of all of the elongated structures therein so that the motive fabric/sheet/structure may assume or adopt the desired shape or pose.

According to yet another set of embodiments, a motive fabric, sheet, flipper, or other structure comprising one or more elongated structures, and perhaps an elongated structure(s) itself/themselves, may be used as limbs that may be used in manufacturing or transportation. Such a limb comprising one or more elongated structures may itself be elongated in shape and may function to direct movement or channeling of items, materials, boxes, etc., as the case may be, on the floor of a plant or warehouse or along a conveyor or an assembly line. Such a motive limb structure of the present invention may be incorporated into these processes to direct movements in response to control signals or other instructions. Such operations by the motive limbs of the present invention may be used to even bypass set assembly pathways or lines for manufacturing processes and allow a more dynamic non-linear manufacturing process.

Figure 10:
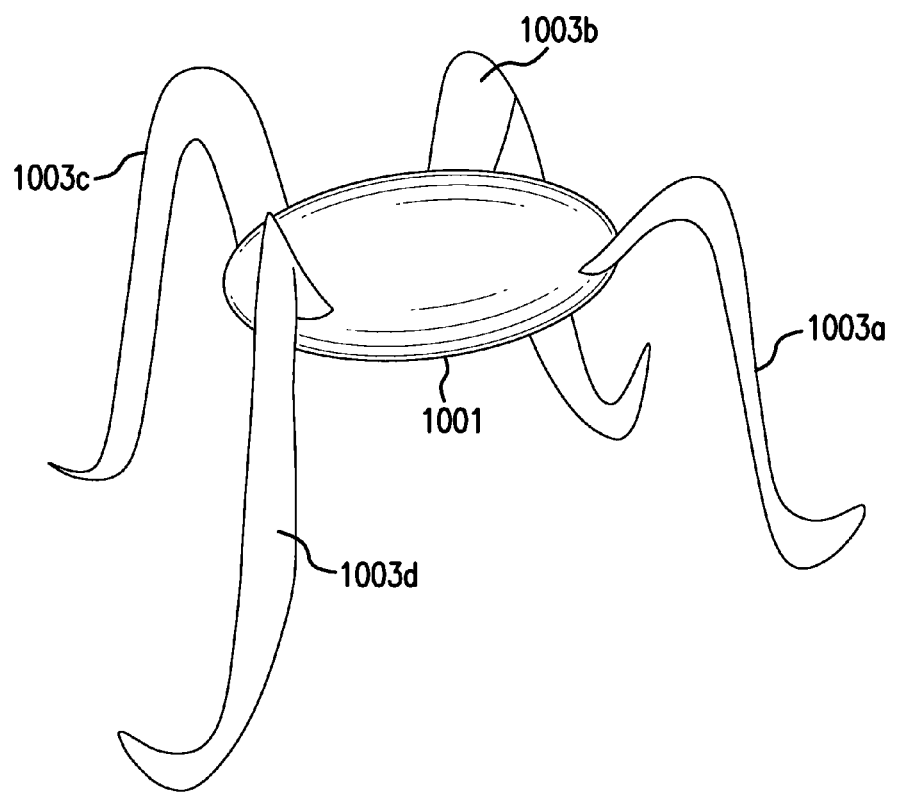
FIG. 10 is a perspective view of a vehicle with a plurality of mobile limbs according to an embodiment of the present invention for use in locomotion across a surface or ground.

According to yet another set of embodiments, motive limbs as similarly described above comprising a plurality of elongated structures surrounded and enclosed by a fabric(s) or sheet(s) of material may be used as "legs" for locomotion. A device or apparatus may have a plurality of these motive limbs or legs that are attached to a device at their proximal ends and touch the ground at their distal ends that may also function as feet. These limbs or legs may move in a coordinated fashion over a distance (e.g., like the legs of an insect or spider) by having these limbs or legs "walk" on the ground. Basically the elongated structure(s) inside each limb undergo coordinated movement via their actuators to carry out the coordinated movements between the different limbs/legs. For example as shown simply and conceptually in FIG. 10, a base structure 1001 may have a plurality of limbs or legs 1003*a-d* attached at or near their proximal ends to the base structure 1001, such that their distal ends may contact, touch, walk, etc., on the ground.

Such a walking form of movement with these limbs or legs of the present invention may take place over a variety of different uneven, rough and/or unpaved terrains. Such a walking mechanism may also be more efficient than wheeled forms of transportation since frictional losses may be greatly avoided. The walking movement for each limb or leg may generally involve a sequence of lifting of the leg/limb form a first position on the ground, repositioning the leg/limb and then lowering the leg such that the distal end of the leg/limb contact and rests on ground at a new second position away from the first position. Thus, its function is not impaired by uneven surfaces or terrains that are difficult for wheeled vehicles to overcome. According to some embodiments, the distal end or foot of each limb/leg may have or include a buoyant material that may enable the vehicle comprising these legs/limbs to walk on the top surface of a liquid or body of water much like on solid ground.

According to another broad aspect of the present invention, methods are provided for the assembly, construction and/or operation of an individual unit/segment and/or the assembly of two or more units/segments to form an elongated structure as described herein. Embodiments of the present invention may include the insertion or placement of an elongated structure inside a sleeve and/or attachment of an elongated structure directly or indirectly to a fabric or sheet, such as to make a motive or sheet, other higher order structures, such as a fan, turbine, limb, flipper, etc. Embodiments of the present invention may further include methods for operating and/or controlling the electromagnet(s) of a unit or segment and/or an elongated structure to cause one or more movement(s) of the unit/segment and/or an elongated structure as described herein. Moreover, embodiments of the present invention further include methods of operating and/or controlling a plurality of elongated structures forming part of a motive fabric or sheet or other higher order structure, such as a fan, turbine, limb, flipper, etc., to coordinate their movement. Such methods of operation of the electromagnet(s) of a unit/segment and/or an elongated structure(s) may be controlled by a base computer and/or one or more controller(s) of the various unit(s), segment(s) or node(s) of the unit(s)/segment(s) and/or elongated structure(s).

While the present invention has been disclosed with reference to certain embodiments, it will be apparent that modifications and variations are possible without departing from the spirit and scope of the invention as defined in the appended claims. Furthermore, it should be appreciated that all examples in the present disclosure, while illustrating embodiments of the invention, are provided as non-limiting examples and are, therefore, not to be taken as limiting the various aspects so illustrated. The present invention is intended to have the full scope defined by the language of the following claims, and equivalents thereof. Accordingly, the drawings and detailed description are to be regarded as illustrative and not as restrictive.

What is claimed is:

1. A unit comprising:
a ball having a generally spherical outer shape and a first end and a second end, the first end and the second end being on opposite sides of the ball, the ball comprising:
a central conducting channel;
a lateral conducting channel;
a plurality of spaced-apart electromagnets; and
a controller, the controller being in electrical communication with one or more of the plurality of electromagnets;
wherein the central conducting channel is configured to provide an electrical connection between a first outer position at or near the first end of the ball and a second outer position at or near the second end of the ball, and
wherein the lateral conducting channel is configured to provide an electrical connection between the central conducting channel and at least one lateral outer position on a circumferential side of the ball.

2. The unit of claim 1, wherein the plurality of electromagnets are equally spaced-apart.

3. The unit of claim 1, wherein the plurality of electromagnets comprises three or more spaced-apart electromagnets.

4. The unit of claim 1, wherein the plurality of spaced-apart electromagnets are positioned within an electromagnet plane.

5. The unit of claim 4, wherein the electromagnet plane is perpendicular to a central axis of the ball, the central axis passing through the spherical center of the ball and through the first end and the second end of the ball.

6. The unit of claim 5, wherein the electromagnets are positioned such that the electromagnet plane is closer to the second end than the first end of the ball.

7. The unit of claim 1, wherein each of the plurality of spaced-apart electromagnets are partially or fully embedded within the sphere of the ball.

8. The unit of claim 1, wherein the polarity of each of the plurality of spaced-apart electromagnets is approximately aligned with a central axis of the ball, the central axis passing through the spherical center of the ball and through the first end and the second end of the ball.

9. The unit of claim 1, wherein the central conducting channel comprises a central conducting portion and an apical conducting portion, the apical conducting portion being at the first end of the ball, and the central conducting portion providing an electrical connection between the apical conducting portion and the second end of the ball.

10. The unit of claim 1, wherein the ball further comprises:
a gate or switch, the gate or switch being positioned in the electrically conductive path of the central conducting channel,
wherein the gate or switch directs a greater flow of electrical current from the central conducting channel to the lateral conducting channel when the gate or switch is open.

11. The unit of claim 1, wherein the controller is electrically connected to the lateral conducting channel to receive an electrical current from the lateral conducting channel.

12. The unit of claim 1, wherein the controller controls the amount and timing of electrical current delivered to one or more of the plurality of electromagnets.

13. The unit of claim 1, further comprising:
a connector having a first end and a second end, wherein the first end of the connector is fixedly attached to the second end of the ball.

14. The unit of claim 13, further comprising:
a socket, the socket having a central portion and a circumferential side portion that surround a socket cavity, the central portion being located at or near a first end of the socket, and the circumferential side portion being located between the central portion and a second end of the socket, the socket cavity having a generally spherical inner shape,
wherein the socket comprises:
one or more pieces of magnetic material;
a central conducting portion, the central conducting portion being located at or near a first end of the socket; and
a lateral conducting portion, the lateral conducting portion being located at or near a second end of the socket,
wherein the second end of the connector is fixedly attached to the first end of the socket,
wherein the socket has a main opening, the perimeter of the main opening being bounded by the circumferential side portion at the second end of the socket, the main opening being continuous with the socket cavity,
wherein the central conducting portion spans between and electrically connects a first inner surface and a first outer surface of the socket,
wherein the lateral conducting portion spans between and electrically connects a second inner surface and a second outer surface of the socket, and
wherein the second inner surface and the second outer surface are closer to the second end of the socket than the first inner surface and the first outer surface, respectively.

15. The unit of claim 14, wherein the socket cavity has a diameter that is approximately equal to the diameter of the ball.

16. The unit of claim 14, wherein the socket cavity has a diameter that is greater than the diameter of the ball.

17. The unit of claim 14, wherein the socket cavity has a diameter that is less than the diameter of the ball.

18. The unit of claim 14, wherein the one or more pieces of magnetic material are positioned within the circumferential side portion of the socket at or near the second end of the socket.

19. The unit of claim 18, wherein the one or more pieces of magnetic material comprise a plurality of spaced-apart pieces of magnetic material positioned around the socket cavity.

20. The unit of claim 19, wherein the plurality of spaced-apart pieces of magnetic material are equally spaced-apart.

21. The unit of claim 14, wherein the one or more pieces of magnetic material comprises an annular ring of magnetic material.

22. The unit of claim 14, wherein the connector comprises an electrically conductive path for the flow of an electrical current between the first end and the second end of the connector.

23. The unit of claim 14, wherein the connector comprises a longitudinal actuator.

24. The unit of claim 23, wherein the longitudinal actuator comprises a first corresponding portion and a second corresponding portion, wherein the first corresponding portion is fixedly attached to the ball, and the second corresponding portion is fixedly attached to the socket, and wherein the first corresponding portion and the second corresponding portion are coupled together to form the connector.

25. The unit of claim 24, wherein the first corresponding portion comprises a piston and the second corresponding portion comprises a cylinder.

26. The unit of claim 24, wherein the first corresponding portion comprises a cylinder and the second corresponding portion comprises a piston.

27. The unit of claim 24, wherein the first corresponding portion comprises an electromagnet, and the second corresponding portion comprises a magnetic material.

28. The unit of claim 27, wherein the magnetic field generated by the electromagnet of the first corresponding portion of the longitudinal actuator is controlled by the controller.

29. The unit of claim 24, wherein the first corresponding portion comprises a magnetic material, and the second corresponding portion comprises an electromagnet.

30. The unit of claim 29, wherein the electromagnet of the second corresponding portion of the longitudinal actuator is controlled by the controller.

31. A unit comprising:
a ball having a generally spherical outer shape and a first end and a second end, the first end and the second end being on opposite sides of the ball, the ball comprising:
a central conducting channel, the central conducting channel being configured to provide an electrical connection between a first outer position at or near the first end of the ball and a second outer position at or near the second end of the ball; and
a lateral conducting channel, the lateral conducting channel being configured to provide an electrical connection between the central conducting channel and at least one lateral outer position on a circumferential side of the ball;
a plurality of spaced-apart electromagnets; and
a controller, the controller being in electrical communication with one or more of the plurality of electromagnets; and
a socket, the socket having a central portion and a circumferential side portion surrounding a socket cavity, the central portion being located at or near a first end of the socket, and the circumferential side portion being located between the central portion and a second end of the socket, the socket cavity having a generally spherical inner shape,
wherein the socket comprises:
one or more pieces of magnetic material;
a central conducting portion, the central conducting portion being located at or near a first end of the socket and spanning between and electrically connecting a first inner surface and a first outer surface of the socket; and
a lateral conducting portion, the lateral conducting portion being located at or near a second end of the socket and spanning between and electrically connecting a second inner surface and a second outer surface of the socket,
wherein the second inner surface and the second outer surface of the socket are closer to the second end of the socket than the first inner surface and the first outer surface of the socket, respectively, wherein the socket has a main opening at the second end of the socket that is continuous with the socket cavity, and wherein the ball is positioned inside the socket to couple the ball and the socket together.

32. The unit of claim 31, wherein the one or more pieces of magnetic material of the socket and the plurality of electromagnets of the ball comprise an articulating actuator.

33. The unit of claim 31, further comprising:
a connector,
wherein the connector is attached to either or both of: the ball or the socket.

34. The unit of claim 33, wherein the connector has a first end and a second end, and the first end of the connector is fixedly attached to the second end of the ball.

35. The unit of claim 33, wherein the connector has a first end and a second end, and the second end of the connector is fixedly attached to the first end of the socket.

36. The unit of claim 33, wherein the connector comprises a longitudinal actuator.

37. The unit of claim 36, wherein the longitudinal actuator comprises a first corresponding portion and a second corresponding portion, and
wherein the first corresponding portion is fixedly attached to the ball, and the second corresponding portion is fixedly attached to the socket.

38. The unit of claim 31, further comprising:
a first corresponding portion or a second corresponding portion of a longitudinal actuator,
wherein the first corresponding portion is fixedly attached to the ball or the second corresponding portion is fixedly attached to the socket.

39. The unit of claim 31, further comprising:
an articulating actuator, the articulating actuator comprising the one or more pieces of magnetic material of the socket and the plurality of electromagnets of the ball.

40. A unit, comprising:
a socket, the socket having a central portion and a circumferential side portion that surround a socket cavity, the central portion being located at or near a first end of the socket, and the circumferential side portion being located between the central portion and a second end of the socket, the socket cavity having a generally spherical inner shape,
wherein the socket comprises:
one or more pieces of magnetic material;
a central conducting portion, the central conducting portion being located at or near a first end of the socket; and
a lateral conducting portion, the lateral conducting portion being located at or near a second end of the socket,
wherein the socket has a main opening, the perimeter of the main opening being bounded by circumferential side portion at the second end of the socket, the main opening being continuous with the socket cavity,
wherein the central conducting portion spans between and electrically connects a first inner surface and a first outer surface of the socket,
wherein the lateral conducting portion spans between and electrically connects a second inner surface and a second outer surface of the socket, and
wherein the second inner surface and the second outer surface are closer to the second end of the socket than the first inner surface and the first outer surface, respectively.

41. An elongated structure comprising:
a first unit comprising a first ball, a first socket and a first connector, the first ball and the first socket being physically linked together by the first connector; and
a second unit comprising a second ball, a second socket and a second connector, the second ball and the second socket being physically linked together by the second connector,
wherein the first ball and the second ball each have a generally spherical outer shape and a first end and a second end, the first ball and the second ball each comprising:
a central conducting channel, the central conducting channel being configured to provide an electrical connection between a first outer position at or near the first end and a second outer position at or near the second end of the respective ball; and
a lateral conducting channel, the lateral conducting channel being configured to provide an electrical connection between the central conducting channel and at least one lateral outer position on a circumferential side of the respective ball;
a plurality of spaced-apart electromagnets; and
a controller, the controller being in electrical communication with one or more of the plurality of electromagnets, and
wherein the first socket and the second socket each have a first end and a second end, a socket cavity and a main opening, the socket cavity having a generally spherical inner shape, and the main opening being positioned at the second end of the socket and continuous with the socket cavity, the first socket and the second socket each comprising:
one or more pieces of magnetic material;
a central conducting portion, the central conducting portion being located at or near a first end of the respective socket and spanning between and electrically connecting a first inner surface and a first outer surface of the respective socket; and
a lateral conducting portion, the lateral conducting portion being located at or near a second end of the respective socket and spanning between and electrically connecting a second inner surface and a second outer surface of the respective socket,
wherein the second ball of the second unit is positioned inside the first socket of the first unit to couple the first unit and the second unit together.

42. The elongated structure of claim 41, further comprising:
a tubular sheath, the tubular sheath surrounding the first unit and the second unit.

* * * * *